United States Patent
Kato et al.

(10) Patent No.: US 6,439,359 B1
(45) Date of Patent: Aug. 27, 2002

(54) DAMPER FOR VEHICLES

(75) Inventors: Rentaro Kato; Yoshinori Yasumoto, both of Kasugai; Masaaki Hamada, Konan; Syuji Ikaga, Komaki; Hajime Maeno, Kasugai; Shigemitsu Hattori, Nagoya, all of (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/529,424

(22) PCT Filed: Dec. 8, 1998

(86) PCT No.: PCT/JP98/05530

§ 371 (c)(1),
(2), (4) Date: May 2, 2000

(87) PCT Pub. No.: WO00/14429

PCT Pub. Date: Mar. 16, 2000

(30) Foreign Application Priority Data

Sep. 2, 1998 (JP) ............................................. 10-248519

(51) Int. Cl.[7] .................................................. F16F 7/10
(52) U.S. Cl. .................. 188/379; 267/293; 267/140.11; 267/140.2
(58) Field of Search ............................... 188/378, 379, 188/380; 267/292, 293, 294, 139, 140, 140.11, 140.12, 140.13, 140.4, 140.5, 141, 141.1, 141.2

(56) References Cited

U.S. PATENT DOCUMENTS

| | | | |
|---|---|---|---|
| 2,714,161 A | * 7/1955 | Featherstun | 188/378 |
| 3,612,222 A | * 10/1971 | Minor | 188/378 |
| 4,685,531 A | * 8/1987 | Kopich | 180/300 |
| 5,037,073 A | * 8/1991 | Matsumoto et al. | 267/140.1 |
| 5,090,668 A | * 2/1992 | Hamada | 267/141 |
| 5,123,635 A | * 6/1992 | Bouhours | 267/140.1 |
| 5,398,907 A | * 3/1995 | Kelchner | 267/140.3 |
| 5,413,319 A | * 5/1995 | Hein et al. | 267/140.12 |
| 5,565,251 A | * 10/1996 | Tang et al. | 267/141.2 |
| 5,731,359 A | * 3/1998 | Moser et al. | 267/140.11 |
| 5,735,257 A | * 4/1998 | Walk | 188/378 |
| 6,007,058 A | * 12/1999 | Kokubo et al. | 267/140.12 |
| 6,125,977 A | * 10/2000 | Nekomoto et al. | 188/378 |

OTHER PUBLICATIONS

U.S. application No. 09/383,398, Aug. 26, 1999, Pending.
U.S. application No. 09/529,424, May 2, 2000, Pending.
U.S. application No. 09/698,040, Oct. 30, 2000, Pending.

* cited by examiner

Primary Examiner—Paul N. Dickson
Assistant Examiner—Devon Kramer
(74) Attorney, Agent, or Firm—Oblon, Spivak, McClelland, Maier & Neustadt, P.C.

(57) ABSTRACT

A vibration restraining apparatus for vehicle of the present invention is comprised of a housing formed by a rigid material and having an inner space, and fixed to a vibration transmitting member; a filled member sealed in the inner space of said housing in a non-adhered state with leaving a gap with respect to a vibrating direction of said housing, and formed by an elastic body at least at a surface thereof. When the housing resonates by vibration transmitted from the vibration transmitting member, the filled member contacts inner surface parts located at both sides of the housing in a vibrating direction thereof to exercise a damping character due to an energy loss caused by a sliding friction and a collision. Thus, a large damping character occurs inside of the housing to reduce vibration of the housing effectively. As a result, vibration of the vibration transmitting member is effectively reduced. The vibration restraining apparatus for vehicle of the present invention can be lightened in weight, does not have a temperature dependency, and can exercise the vibration restraining effect for plural resonances having different frequencies.

23 Claims, 20 Drawing Sheets suspend position of rubber straps

DAMPER FOR VEHICLES

TECHNICAL FIELD

This invention relates to a vibration restraining apparatus for a vehicle attached to a vibration transmitting member to restrain a harmful vibration occurring therein. Here, the vibration transmitting member includes a suspension arm, sub frame, body panel, engine mounting bracket, engine unit or exhausting device of an automobile, and an arm member or a body panel of an electric train.

BACKGROUND ART

A running vehicle such as an automobile for example generates a vibration by operation of an engine as a power source, and the generated vibration is inputted into the road through surface during running of the vehicle. These vibrations are in turn transmitted to the vehicle body through an engine mounting bracket or a vehicle body frame supporting an engine unit or a suspension arm or sub frame connected to wheels. If a natural resonance occurs in these vibration transmitting members, the vibration transmission to the vehicle body is amplified to cause noise in the vehicle room and vibration of vehicle frame.

In view of the above, in the prior art, the vibration occurred in those vibration transmitting member is restrained or damped by attaching a mass damper, dynamic damper or a vibration restraining member.

The above mass damper is constructed by adding a mass (weight) to the vibration transmitting member, so that the natural vibrating frequency of the vibration restraining member is varied, thus restraining a target vibration. However, more mass needs to be added for obtaining sufficient vibration restraining effect by the mass damper, which increases the weight of the mass damper.

Also, the above dynamic damper is a vibration absorbing apparatus constructed by a portion attached to the vibration transmitting member, a mass (mass body) disposed apart from the attach portion, a rubber elastic body (spring) disposed between the mass and the attached portion and connects them integrally. This dynamic damper is attached to the vibration transmitting member at an attached portion thereof to reduce amplitude of the vibration transmitting member by resonance of the mass/rubber elastic body in resonances of the vibration transmitting member in resonance vibration.

However, the resonance frequency of this dynamic damper is determined based on weight of the mass body and spring constant of the rubber elastic body, so the dynamic damper can restrain the vibration at only one frequency area in the resonance occurred in the vibration transmitting member, but is not effective with respect to plural resonances. Also, the weight of the mass body and the spring constant of the rubber elastic body are set based on applying a direction of them (vibration direction) determined by the positional relation between the mass body and the rubber elastic body, and therefore have directionality. Accordingly, restraining the vibrations in many directions simultaneously by one dynamic damper is difficult. Also, the spring constant of the rubber elastic body used as the spring easily varies depending on temperature and has a large temperature dependency, so that the vibration restraining effect is deteriorated at a high temperature and at a low temperature.

The above vibration restraining member is formed like a sheet by single layer or plural layers made of asphalt, urethan, acrylic resin or metallic plate, and is adhered to a surface of the panel-like vibration transmitting member such as a roof panel or floor panel for use. The vibration restraining member deforms elastically corresponding to resonance of the vibration transmitting member to absorbs a vibrating energy of the vibration transmitting member by an internal friction generated at that time, thereby damping resonance of the vibration transmitting member.

However, such vibration restraining member needs to be adhered to the vibration transmitting member in rather broad area, and has larger weight due to a forming material of relatively large specific gravity. In addition, due to the temperature dependency of the vibration restraining member, the vibration restraining effect may be decreased at a high temperature and low temperature when the vibration restraining member is tuned at the room temperature.

Thus, the mass damper, dynamic damper and vibration restraining member which have been conventionally used have above problems.

DISCLOSURE OF INVENTION

The present invention is made in view of the above circumstances and has a subject matter or purpose to provide a vibration restraining apparatus for vehicle which can be lightened in weight, does not have the temperature dependency, and can perform the vibration restraining effect for plural resonances having different frequencies.

A vibration restraining apparatus of the present invention is featured by a housing made of a rigid material and having an inner space, and fixed to a vibration transmitting member; and a filled member sealed in the inner space of the housing in a non-adhered state with leaving a gap with respect to a vibrating direction of the housing, and formed by an elastic body at least at a surface thereof.

In this vibration restraining apparatus for vehicle, when the housing resonates by the vibration transmitted from the vibration transmitting member, the filled member contacts (abuts) with (onto) inner surfaces of the housing at both sides in the vibrating direction, so that the damping character of the filled member relative to the housing due to an energy loss caused by a sliding friction and a collision is exercised. In this way, the large damping character occurs inside the housing to restrain the vibration of the housing effectively. As a result, the vibration of the vibration transmitting member is effectively restrained.

In the vibration restraining apparatus for vehicle of the present invention, the damping character is exercised based on the energy loss caused by the sliding friction and the collision generated when the filled member constants (abuts) with (onto) the inner surface of the housing, so the damping character can be exercised for plural resonances of different frequencies. Also, the vibration damping operation does not have the temperature dependency since the amount of the loss energy due to the sliding friction and the collision is hardly affected by the temperature.

In addition, in the vibration restraining apparatus for vehicle, since the gap formed between the inner surface of the housing and the filled member can be freely set corresponding to a vibrating direction of the housing (vibrating direction of vibration transmitting member), the vibration in the all directions of the housing can be restrained.

Here, when the housing is lightened, vibration of the housing may increase corresponding to a decrease in inertia if the inputted vibration is constant. However, the vibration is damped by disposing the filled member in the inner space of the housing by leaving the gap in the vibration restraining apparatus for a vehicle of the present invention, so lightening of the housing can be realized without worsening the vibration.

Accordingly, the vibration restraining apparatus for vehicle can be lightened, does not have the temperature dependency, and can exercise the vibration restraining effect for plural resonances of different frequencies. Here, the vibration restraining apparatus for vehicle of the present invention can be attached to all kinds of the vibration transmitting members of the vehicle to restrain the vibration thereof satisfactorily.

The vibration restraining apparatus for vehicle of the present invention can be embodied by various means or modes to be explained below.

That is, the housing of the present invention is formed by a rigid material and has a closed inner space therein. As the rigid material for forming the housing, metals such as an iron or an aluminium alloy etc. or a hard resin can be adopted, for example. These rigid materials preferably have an elasticity rate more than $5 \times 10^4$ MPa. If the elasticity rate is smaller than $5 \times 10^4$ MPa rigidity of the housing becomes insufficient, so that shape of the gap to be formed between the inner surface of the housing and the filled member sealed in the inner space may be unstable.

The housing can have an optional shape such as a circular tube or a square tube, and can be linear, bent or curved.

Here, when the vibration transmitting member is an arm member for vehicle of hollow shape having an inner space such as a suspension arm for example, this arm member can be used as the housing. Also, by forming an inner space in the vibration transmitting member to attach the vibration restraining apparatus for vehicle therein, the vibration transmitting member can be used as the housing. This housing can be formed so as to be integral with the vibration transmitting member, which makes attaching working of the vibration restraining apparatus for vehicle to the vibration transmitting member unnecessary.

In addition, the housing can be constructed to have a bracket for fixing the vibration restraining apparatus to the vibration transmitting member.

A plurality of inner spaces can be provided in the housing by forming partitioning walls. For example, in case where the housing is formed by an extrusion-formed body, the partitioning walls extending along an extruding direction can be easily formed in the extrusion-forming. By formation of plural inner spaces into which the filled members are sealed, the vibration restraining effect can be increased.

The filled member of the present invention is sealed into the inner space of the housing in a non-adhered state with leaving the gap with respect to the vibrating direction of the housing. That is, the filled member is disposed in the inner space so as to be freely moved. The filled member can have a plane, a curved surface, or a convex/concave shape. In summary, the gap existed between the surface of the filled member and the inner surface of the housing is sufficiently formed at a surface part of the filled member most protruded.

The minimum gap rate of the gap formed between the housing and the filled member is preferably selected smaller than 30%. If the minimum gap rate is more than 30%, when the housing vibrates in particularly small amplitude, the filled member hardly contacts (abuts) with (onto) the inner surface of the housing located at both sides in the vibrating direction, so that satisfactory vibration restraining effect is not exercised. Here, "minimum gap rate" is calculated, in a state where one surface of the filled member is contacted with the inner surface of the housing, by dividing distance dimension of the gap formed between the most protruded part of the filled member at the other end and the opposing inner surface of the housing by distance dimension between the opposed inner surfaces of the housing.

The gap formed between the housing and the filled member preferably has a length dimension of 0.1 to 0.5 mm. If the gap dimension is smaller than 0.1 mm the filled member hardly moves in the inner space of the housing, so that the energy transferring due to contact (abutment) of the filled member with (onto) the housing decreases, which results in poor or insufficient vibration restraining effect. To the contrary, if the gap dimension is more than 0.5 mm, a loud noise may be generated when the filled member contacts (abuts) with (onto) the housing.

The filled member of the present invention is not necessarily disposed over the whole area of the housing in a longitudinal direction thereof even when the housing has a longitudinal shape, but may be locally or partially disposed at a portion of the housing where the vibration is generated particularly.

In addition, the filled member of the present invention is formed by an elastic body at least at a surface thereof. If surface of the filled member is formed by the rigid material, the colliding sound or noise may occur when the filled member contacts (abuts) with (onto) the inner surface of the housing. For this reason, the surface portion of the filled member preferably has a hardness value smaller than shore D hardness 80. As the elastic body forming at least the surface of the filled member, a rubber, resin or elastic foamed body formed by the rubber and the resin as the main components can be adopted. Such elastic body preferably has characteristics such that the compression elasticity rate thereof is 1 to $10^4$ MPa, and tan $\delta$ (loss tangent) is more than $10^3$, preferably 0.01 to 10.

As the resin, a fiber reinforced resin (FRP) having an elasticity rate more than $10^3$ can be adopted. The elastic foamed body suitably adopted is formed by foaming a filled member forming material including at least one of the rubber and the resin, and the foaming agent as the main component.

In addition, as the rubber utilized, a high specific gravity rubber having a density of more than 1.5 g/cm$^3$ can be suitably adopted. If the density thereof is smaller than 1.5 g/cm$^3$ the volume of the rubber becomes large to obtain the desired weight of the filled member, thus above high specific gravity rubber being effective to omit a surplus space. This high specific gravity rubber can be formed, for example, by adding a filling agent for high specific gravity such as a metal powder (iron, tungsten) or a metal oxide powder (zinc oxide, lead oxide etc.) to a polymer such as a natural rubber (NR) or an ethylenepropylene-diene ternary copolymer (EPDM). The high specific gravity rubber having density of 2.0 g/cm$^3$ can be obtained by adding the zinc oxide of 250 weight parts to the natural rubber of 100 weight part. To the high specific gravity rubber, various adding agents such as a vulcanizing agent, an aging preventing agent, a working promoting agent or a plasticizer can be added.

When the vibration restraining apparatus for vehicle of the present invention is used in a high temperature environment, the high specific gravity rubber preferably has the heat resistance character that a tension strength change after aging in 120° C.×70 hours is less than 50%. Such high specific gravity rubber can be formed by using an olefin series thermoplastic elastmer (TPO) or a styrene series thermoplastic elastmer (TPS) as the polymer, and using a barium sulfate etc. as the filled member for high specific gravity. In this case, the high specific gravity rubber having the density of 2.0 g/cm$^3$ can be formed by selecting the weight ratio of the TPO and the barium sulfate 100:230, and that having the density of 3.0 g/cm$^3$ can be formed by selecting the weight ratio of the TPO and the barium sulfate 100:770.

The filled member of the present invention can be formed by a single member having size so that a gap is formed between the filled member and the housing when it is inserted into the inner space. Also, when the above elastic foamed body is used as the filled member, the filled member can be disposed in the inner space by foaming a filled member forming material in the inner space. In this case, the elastic foamed body (filled member) foamed and A formed in the inner space of the housing can form the gap between the filled member and the housing by utilizing a thermal shrinkage after the foaming. Thus, according to this method, at the time when the filled member forming material foamed in the inner space of the housing the elastic foamed body is filled and disposed in the inner space, whereby a working main-hour can be reduced and simplified.

As the rigid material forming other part except for the surface part an optional material such as a metal, a hard resin or a stone can be suitably adopted.

In addition, the filled member of the present invention is not necessarily formed into the solid shape, but can be formed into a tubular or cylindrical shape both ends of which are opened, or can have a closed space therein. The tubular shape and the closed space can reduce using material amount of the filled member to lighten weight of the filled member.

Further, when the filled member is formed into the tubular shape, it can have a constraining layer at an inner periphery thereof. According to this construction, the constraining layer constrains an elastic deformation of the elastic body forming the surface part of the filled member, so that more sliding and more collision of the filled member relative to the housing are obtained, which is convenient to restrain the vibration more securely. This constraining layer can be constructed for example by a film formed by a metal or a resin.

BEST MODE FOR CARRYING OUT INVENTION

Hereinafter, various embodiments 1 to 9 in which the present invention is embodied will be explained with reference to attached drawings.

Embodiment 1

Figure 1:
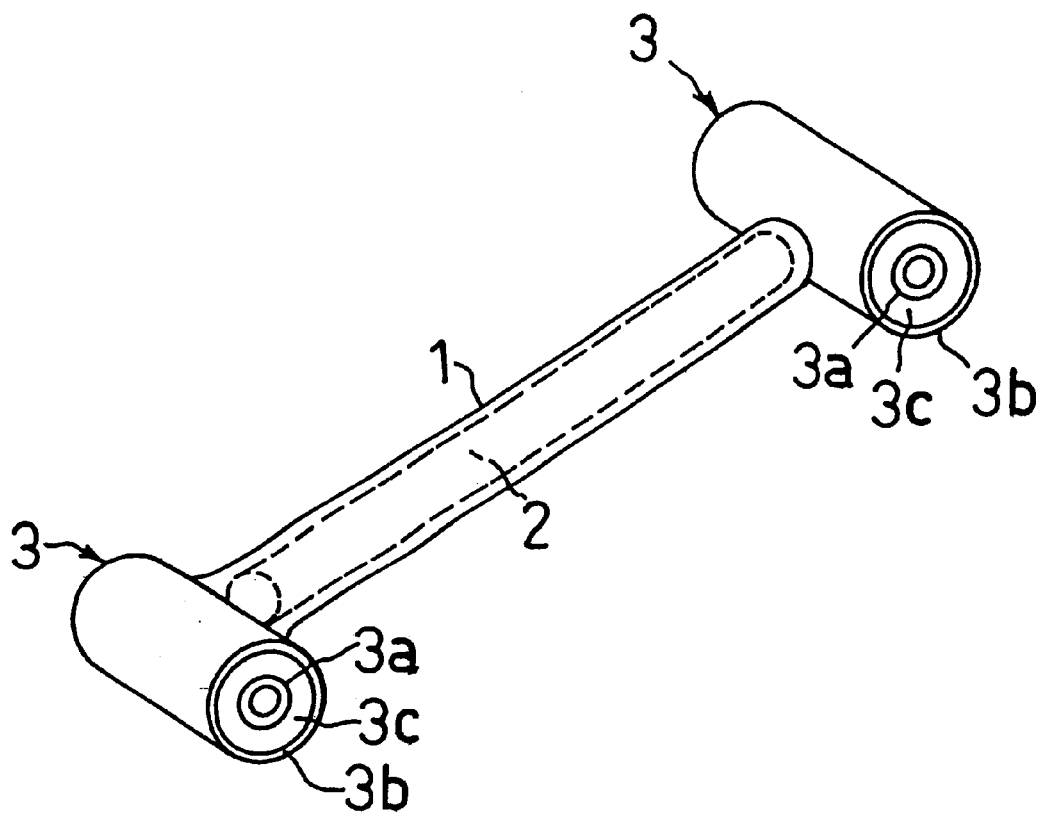
FIG. 1 is a perspective view of a vibration restraining apparatus for vehicle according to an embodiment 1 of the present invention.
Figure 2:
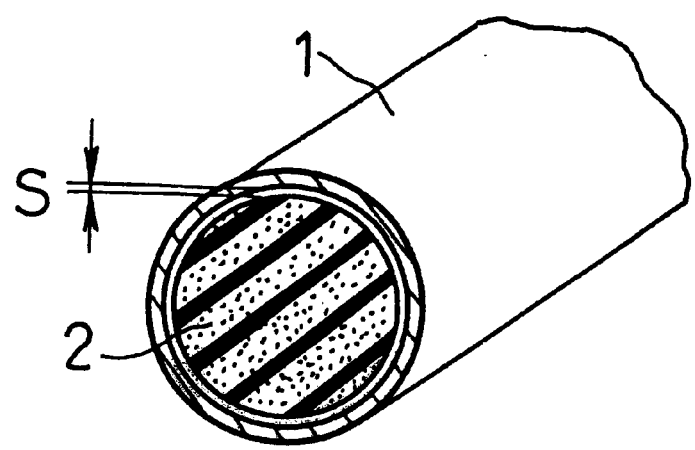
FIG. 2 is a broken perspective view of the vibration restraining apparatus for vehicle according to the embodiment 1 of the present invention.

FIG. 1 is a perspective view showing a vibration restraining apparatus for vehicle of this embodiment, and FIG. 2 is a broken perspective view of the same.

The vibration restraining apparatus for vehicle of this embodiment is constructed by using a suspension arm for an automobile of hollow pipe shape having an inner space as a housing. This suspension arm is, as shown in FIGS. 1 and 2, constructed by a tubular arm body 1, a filled member 2 filled and disposed in an inner space of the arm body 1 in a non-adhered state with leaving a gap, and a pair of connecting members 3, 3 respectively fixed to both ends of the arm body 1, as the main parts.

The arm body 1 is made of an aluminium alloy, and formed into a tubular shape extending lineally in substantially constant diameter.

The whole filled member 2 is constructed by an elastic foamed body formed by foaming a filled member forming material by the foaming magnification of three times. The filled member forming material is produced by mixing an azodicarboxylic amide as a foaming agent by 15 weight parts, sulfur as a vulcanizing agent by 15 weight parts, a phenol resin, carbon black, calcium carbonate, a vulcanization promoting agent and a liquid-state rubber with an acrylonitrile rubber (NBR) as a rubber material by 100 weight parts.

The filled member 2 is formed into a circular pillar shape following to shape of an inner peripheral surface of the arm body 1 by foaming the filled member forming material within the inner space of the arm body 1, and is filled and disposed over substantially the whole axial area of the inner space simultaneous with the foaming. This filled member 2 is not adhered to any area of the inner peripheral surface of the arm body 1, and the gap S is formed between the filled member 2 and the arm body 1 by thermal shrinkage of the filled member 2 occurred in the foaming thereof within the inner space of the arm body 1. That is, the filled member 2 is filled and disposed in the inner space of the arm body 1 to be freely moved. The minimum gap rate of the gap S formed between the filled member 2 and the arm body 1 about 3%. Also, the filled member 2 has characteristics such that the compression elasticity rate thereof is about 80 MPa, and tan δ (loss tangent) is about 0.25.

Each of the connecting members 3, 3 is constructed by an inner tubular metal fitting 3a, 3a, an outer tubular metal fitting 3b, 3b coaxially disposed outside thereof with leaving a space, and a rubber elastic body 3c, 3c disposed between the inner tubular metal fitting 3a, 3a and the outer tubular metal fitting 3b, 3b and connects them with each other. The connecting members 3, 3 are attached to the arm body 1 by fixing the outer cylindrical metal fittings 3b, 3b to the both end portion of the arm body 1. In this way, openings at both ends of the arm body 1 are sealed by the outer tubular metal fittings 3b, 3b, so that the inner space is brought into the closed condition.

The vibration restraining apparatus for vehicle of this embodiment thus constructed is used as a suspension arm of the automobile by connecting the connecting members 3, 3 at both ends with another connecting portion (vibration transmitting member) and assembled into a suspension mechanism. When vibration is generated in the arm body 1 by an inputted vibration from the road surface during running of the automobile etc., the filled member 2 contacts (abuts) with (onto) the inner surface of the arm body 1 located at both sides in the vibrating direction, so that damping character by the filled member 2 based on the energy loss due to sliding friction and collision is exercised. Thus, the large damping character occurs in the arm body 1 to restrain the vibration of the arm body 1 effectively. Accordingly, the vibration transmitted to the vehicle body through this suspension arm is reduced, thereby preventing deterioration of the vehicle room noise and vehicle body vibration.

As mentioned above, in the vibration restraining apparatus of this embodiment, since the filled member 2 is sealed in the inner space of the arm body 1 in the non-adhered state with leaving the gap S with respect to the vibrating direction, the vibration occurred in the arm body 1 can be effectively restrained by the filled member 2.

In addition, since the whole filled member 2 of this embodiment is foamed by the elastic foamed body, the filled member 2 can restrain the vibration occurred in the arm body 1 when it contacts (abuts) with (onto) the inner surface of the arm body 1 without generating a colliding sound or a noise.

Further, since the filled member 2 can be filled and disposed in the inner space simultaneous with forming of the filled member 2 by foaming the filled member forming material in the inner space, a working man-hour can be decreased and simplified. Here, the gaps can be formed between the filled member 2 and the arm body 1 by utilizing the thermal shrinkage of the filled member 2 which has occurred after the foaming thereof in the inner space, whereby a dimension setting for forming the gaps can be omitted.

Figure 3:
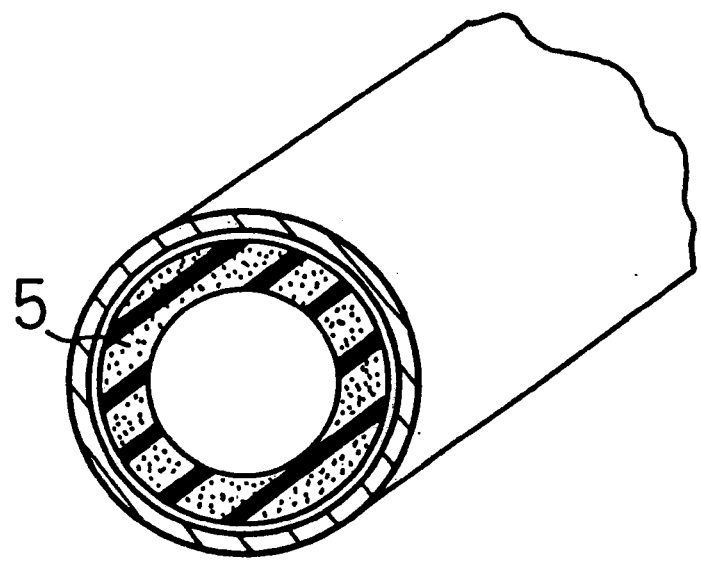
FIG. 3 is a broken perspective view of one deformation of the vibration restraining apparatus for vehicle according to the embodiment 1 of the present invention.

Here, the filled member 2 in the above embodiment is formed into a solid circular pillar by the elastic foamed body, but a filled member 5 shown in FIG. 3 is formed into a hollow circular tube having a cavity therein by an elastic body such as the elastic foamed body. In this case, a decrease of the amount of the elastic body used can lighten the weight of the filled member 5.

Figure 4:
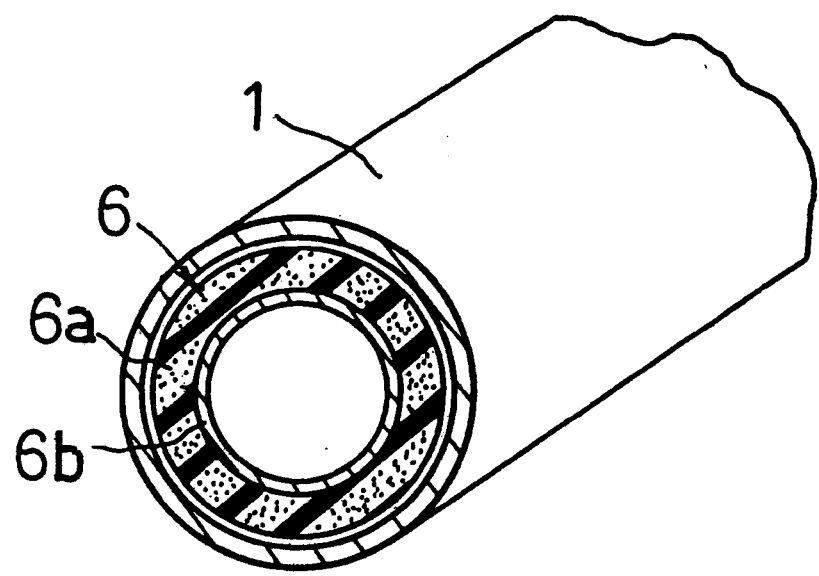
FIG. 4 is a broken perspective view of another deformation of the vibration restraining apparatus for vehicle according to the embodiment 1 of the present invention.

In addition, when the filled member is formed into them tubular shape, as shown in FIG. 4, a filled member 6 can have a body portion 6a formed into the tubular shape by the elastic foamed body, and a constraining layer 6b made of for example a metal film or a resin film and provided on a surface of the inner peripheral surface of the body portion 6a. In this case, an elastic deformation of the body portion 6a forming a surface portion of the filled member 6 is regulated by the constrain wig layer 6b, so that the occurrence of more sliding and more collision between the filled member 6 and the arm body 1 are maintained, which is convenient to restrain the vibration more securely.

Examination 1

For confirming the excellent advantage of the present invention, test samples 1 to 9 in which the material and size of the filled member filled in the inner space of the arm body are varied are prepared, and a hammering test is performed to examine the vibration damping characteristic for each sample.

As the arm body, a pipe made of an aluminium alloy having an outer diameter of 27 mm, an inner diameter of 20.4 mm, a thickness of 3.3 mm, a total length of 470 mm, and a weight of 310 g is used. The filled member material, filled member outer diameter, gap rate, adhered state, and filled member weight are shown in a Table 1.

Here, the high damping foamed rubber as the filled member material is made of a foamed body obtained by heating and foaming a foamed rubber compound in which sulfur of 5 to 25 weight parts; phenol resin of 5 to 200 weight parts; and foaming agent of 5 to 40 weight parts are mixed with NBR of 100 weight parts; and it has density of 0.3 g/cm$^3$, compression elasticity rate of 80 MPa, and tan δ of 0.25. Also, the high rigid foamed rubber is made of a foamed body obtained by heating and foaming the foamed rubber compound in which the sulfur of 10 to 50 weight parts and the foaming agent of 5 to 40 weight parts are mixed with a diene series rubber of 100 weight part and it has the density of 0.3 g/cm$^3$, compression elasticity rate of 170 MPa and tan δ of 0.04.

TABLE 1

| test sample | filled member material | filled member outer diameter (mm) | gap rate (%) | adhered state | filled member weight (/g) |
|---|---|---|---|---|---|
| 1 | no filled member | | | | |
| 2 | high damping foamed rubber | 20.4 | 0 | adhered | 74 |
| 3 | high damping foamed rubber | 19.8 | 3 | non-adhered | 50 |
| 4 | high damping foamed rubber | 17.6 | 14 | non-adhered | 44 |
| 5 | high damping foamed rubber | 13.6 | 33 | non-adhered | 26 |
| 6 | high rigid foamed rubber | 20.4 | 0 | adhered | 42 |
| 7 | high rigid foamed rubber | 20.0 | 2 | non-adhered | 50 |
| 8 | high rigid foamed rubber | 17.7 | 13 | non-adhered | 38 |
| 9 | high rigid foamed rubber | 13.5 | 34 | non-adhered | 24 |

Figure 5:
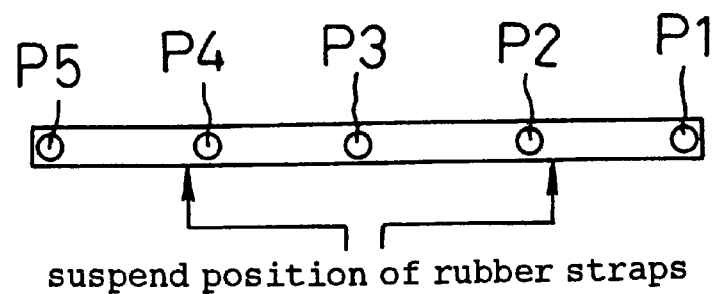
FIG. 5 is an explanatory view showing a hammering position of a test sample in an examination 1.

The hammering to the test samples 1 to 9 has been carried out in a free supporting condition where each of the test samples 1 to 9 is suspended by rubber straps. As shown in FIG. 5, when points shifted inwardly from the both ends of the arm body by 10 mm are indicated as being P1, P2 respectively, and when points where length or distance between points P1 and P2 is equally divided to four parts are indicated as being P2, P3 and P4 respectively, the suspending rubber strap are attached to two points shifted outwardly from the points P2 and P4 by 10 mm, respectively. As the hammering points, the five points P1 to P5 are selected in the test sample 1, while one point P3 is selected in each of the test samples 2 to 9.

The hammering test has been carried out for the test samples 1 to 9 in the above mentioned manner. The inertances (dB(g/N)) of the est samples at a predetermined frequency area are then measured, and the obtained results of the vibration damping characteristics are shown in FIGS. 6 to 13. The vibration damping characteristic of the test sample 1 not having the filled member is shown in all of FIGS. 6 to 13 by a dotted line to compare it with that of another test samples 2 to 9 having the filled members. The vibration damping characteristics of each of the test samples 2 to 9 are shown in FIGS. 6 to 13 by solid lines respectively.

Results:

(1) As to reducing peak level effect (primary bending resonance near 650 Hz).

Figure 6:
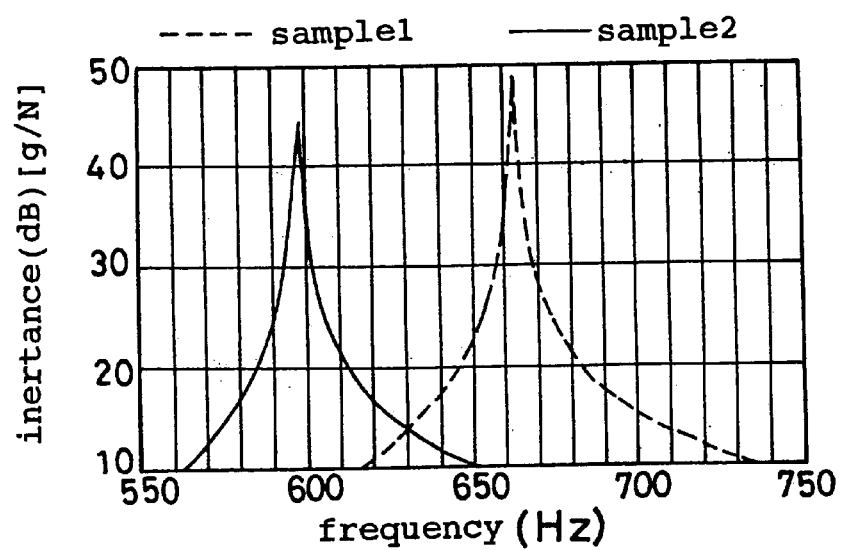
FIG. 6 is a graph showing a vibration damping characteristic of test samples 1 and 2 in examination 1.
Figure 10:
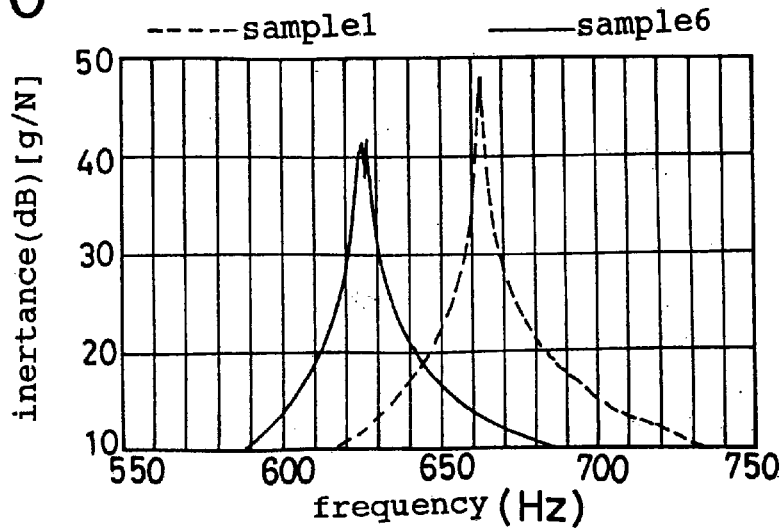
FIG. 10 is a graph showing a vibration damping characteristic of test samples 1 and 6 in examination 1.

As apparent from FIGS. 6 and 10, the test samples 2 and 6 in which the filled members are made of different kinds of material and are filled in the adhered state in the arm body reveal substantially the same vibration damping characteristic, and the peak level of such is lower than that of the test sample 1 by 4 to 6 dB.

Figure 7:
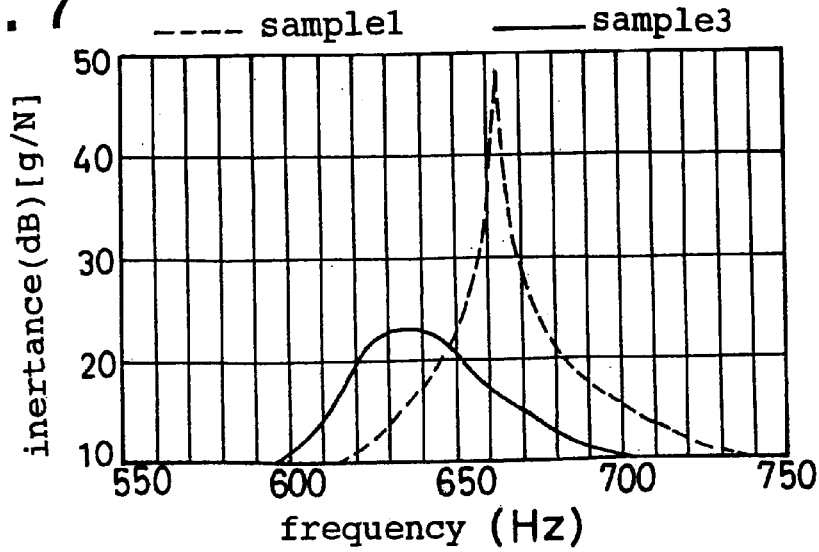
FIG. 7 is a graph showing a vibration damping characteristic of test samples 1 and 3 in examination 1.
Figure 11:
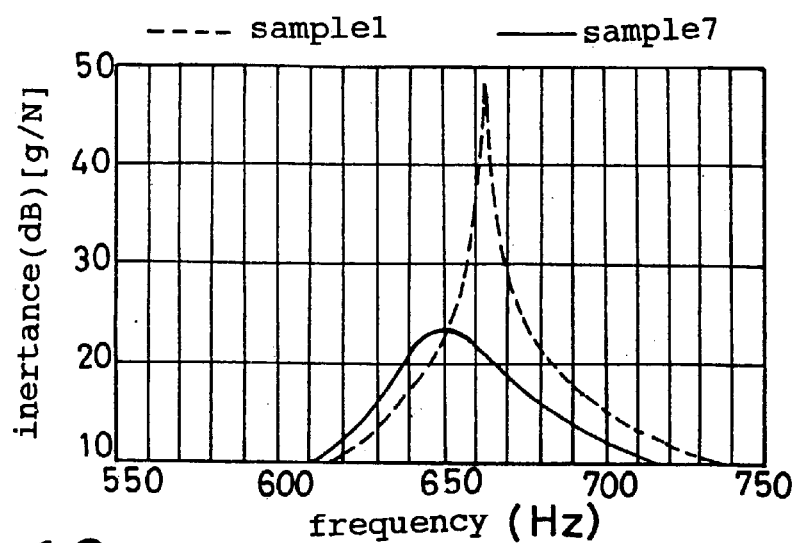
FIG. 11 is a graph showing a vibration damping characteristic of test samples 1 and 7 in examination 1.

As apparent from FIGS. 7 and 11, the test samples 3 and 7 in which the filled materials are made of different kinds of material and are filled in the non-adhered state by substantially same gap rate in the arm body reveal substantially the same vibration damping characteristic, and the peak level of them is lower than that of the test sample 1 by 23 to 25 dB.

Figure 8:
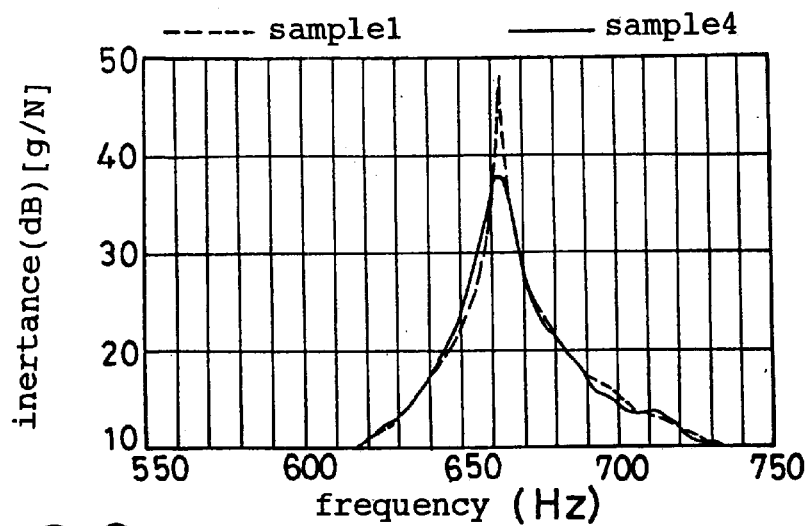
FIG. 8 is a graph showing a vibration damping characteristic of test samples 1 and 4 in examination 1.
Figure 12:
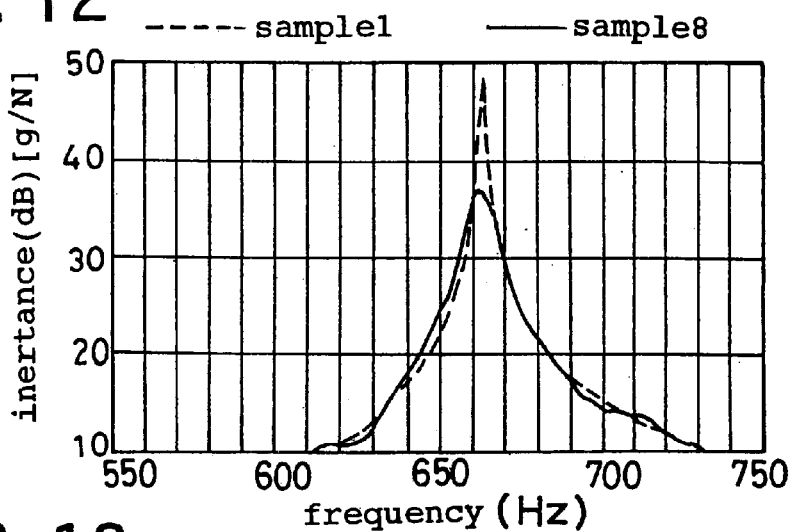
FIG. 12 is a graph showing a vibration damping characteristic of test samples 1 and 8 in examination 1.

As apparent from FIGS. 8 and 12, the test samples 4 and 8 in which the filled materials are made of different kinds of material and are filled in the non-adhered state by substantially same gap rate in the arm body reveal substantially the same vibration damping characteristic, and the peak level of them is lower than that of the test sample 1 by 10 to 11 dB.

Figure 9:
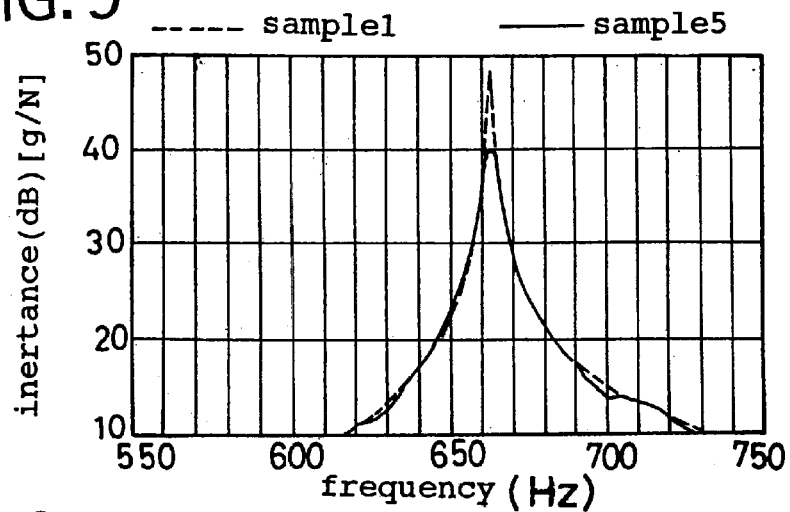
FIG. 9 is a graph showing a vibration damping characteristic of test samples 1 and 5 in examination 1.
Figure 13:
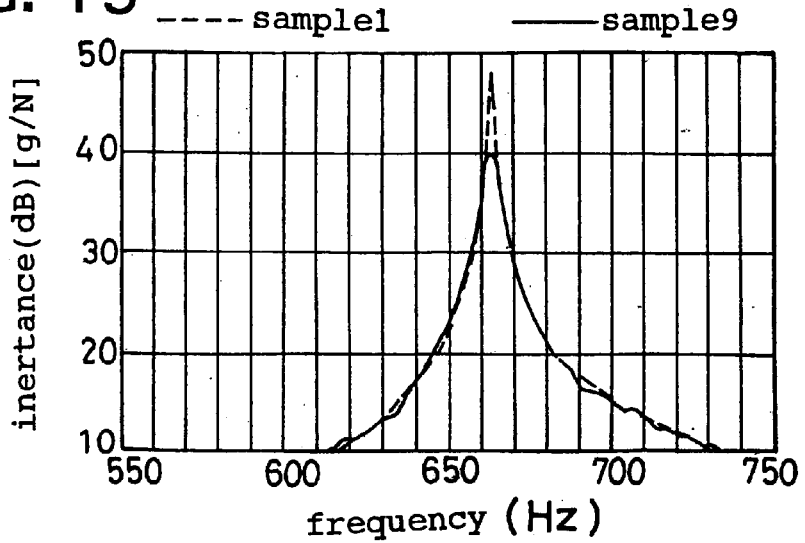
FIG. 13 is a graph showing a vibration damping characteristic of test samples 1 and 9 in examination 1.

As is apparent from FIGS. 9 and 13, the test samples 5 and 9 in which the filled materials are made of different kinds of material and are filled in the non-adhered state by substantially same gap rate in the arm body reveal substantially the same vibration damping characteristic, and the peak level of them is lower than that of the test sample 1 by 7 to 8 dB.

Judging from the above results, it is confirmed that the reducing effect of the peak level is hardly varied by a material difference in the filled member. Also confirmed is that the reducing effect of the peak level of the case where the filled member is filled in the arm body in the non-adhered state (test samples 2 and 6) is larger than the case where it is filled in the arm body in the adhered state (test samples 3, 4, 5, 7, 8 and 9), and this vibration reducing effect increases as the gap rate becomes smaller. In particular, in the test samples 3 and 7 having the smallest gap rate, the peak level is reduced to substantially half the level of the test sample 1, which reveals that the filled member restrains the vibration very well.

(2) As to a shift in peak frequency

As shown from FIGS. 6 and 10, in the test samples 2 and 6 in which the filled member is filled in the arm body in the adhered state respectively, the peak frequency has shifted to the lower frequency side due to the weight increase by the filled member. Usually, the peak frequency shifts to the higher frequency side as rigidity of the arm body increases due to weight increase thereof. Judging from this fact, confirmed is that the dynamic rigidity increase effect due to filling of the filled member to the arm body can not be obtained in the test samples 2 and 6.

Also, as apparent from FIGS. 7 and 11, in the test samples 3 and 7 in which the filled member is filled in the arm body in the non-adhered state respectively, although the peak frequency has been shifted to the lower frequency side, the shifted amount is smaller than that of the above test samples 2 and 6 in which the weight is increased by the filling member.

In particular, in the test samples 3, 5, 8 and 9 in which the filling members of smaller weight are filled in the arm bodies in the non-adhered state, the peak frequencies have hardly shifted, which reveals the filling of the filled members does not affect the shift of peak frequency.

Embodiment 2

Figure 14:
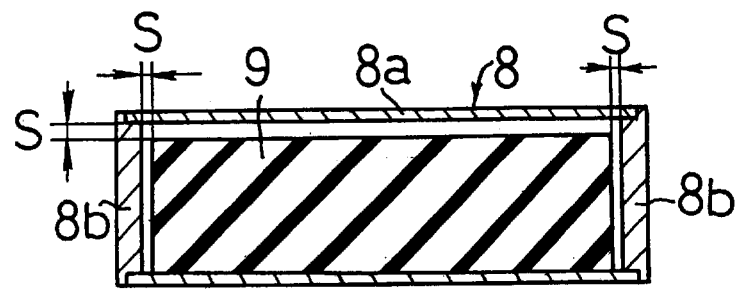
FIG. 14 is a cross-sectional view of the vibration restraining apparatus for vehicle of an embodiment 2 according to the present invention.
Figure 15:
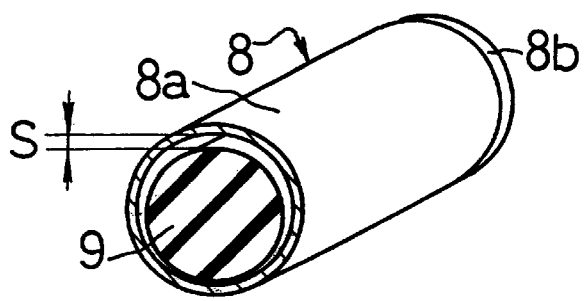
FIG. 15 is a broken perspective view of the vibration restraining apparatus for vehicle of the embodiment 2 according to the present invention.

FIG. 14 is a cross-sections view showing a vibration restraining apparatus for vehicle of an embodiment 2, and FIG. 15 is a broken perspective view of the same.

The vibration restraining apparatus for the vehicle of this embodiment is set on a subframe of an automobile. This vibration restraining apparatus for the vehicle is, as shown in FIGS. 14 and 15, constructed by a housing 8 having an inner cavity, and a filled member 9 is sealed into the inner space of the housing 8 in a non-adhered state with leaving a gap S.

The housing 8 is comprised of a body portion 8a and is formed into a tubular shape having substantially constant diameter by an aluminium alloy, pair of plug portions 8b, 8b made of an aluminium alloy and attached to both ends of the body portion 8a respectively by welding to seal openings. A closed inner space is formed inside the housing 8 by sealing the both end openings of the body portion 8a by the paired plug portions 8b, 8b. This housing 8 has an elasticity rate more than $5 \times 10^4$ MPa.

A whole filled member 9 is constructed by a high specific gravity rubber formed by vulcanizing and forming a rubber compound in which a zinc oxide powder of 250 weight part as a specific gravity increase material, peroxide of 3.5 weight part as a vulcanizing agent, and adding agents such as a carbon black and a vulcanization promoting agent are mixed with natural rubber of 100 weight part. This high specific gravity rubber has characteristics that density is 2.0 $g/cm^3$, and Shore A hardness is 54. This filled member 9 is formed into a circular pillar shape of diameter slightly smaller than diameter of the inner space of the housing 8 and sealed into the inner cavity in a non-adhered state. As a result, a gap S of about 0.3 mm is formed between the filled member 9 and the housing 8, so that the filled member 9 is disposed in the inner space to be freely moved.

Figure 16:
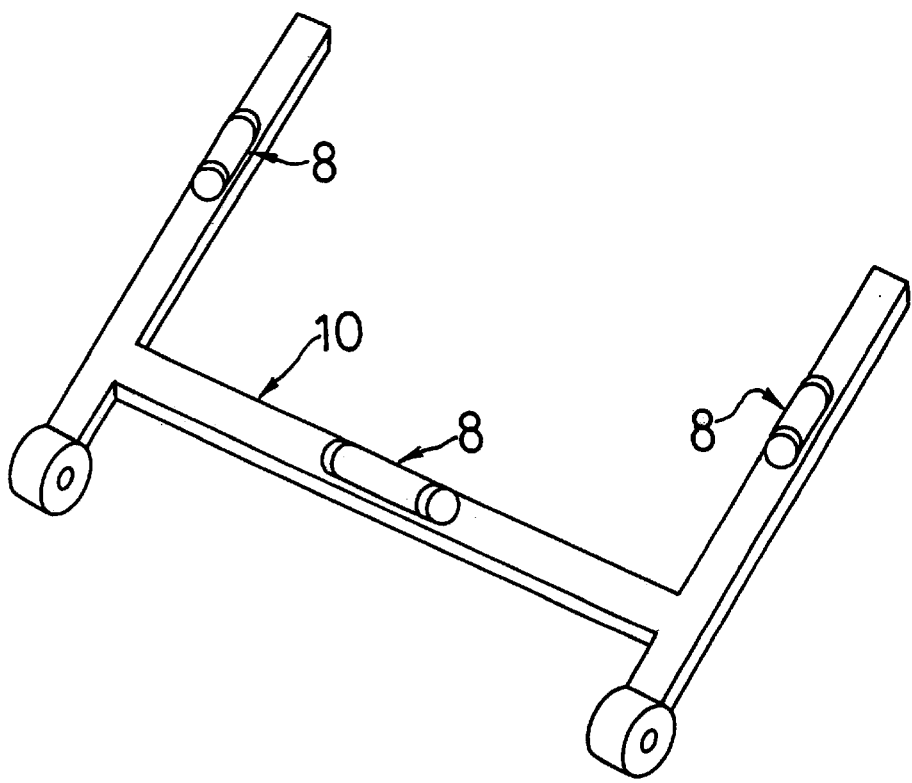
FIG. 16 is a perspective view showing state where the vibration restraining apparatus for vehicle according to an embodiment 2 of the present invention is attached to a sub frame.

The vibration restraining apparatus for vehicle constructed as mentioned above is, as shown in FIG. 16, fixed to a predetermined position on a subframe 10 of an automobile by a welding at the housing 8. Here, the vibration restraining apparatus for vehicle is preferably attached to the subframe 10 at a position where a max. amplitude will occur when the subframe 10 vibrates (position forming an antinode of amplitude) in a direction coinciding with a max. amplitude direction.

During running of the automobiles etc., when the housing 8 resonates by the vibration transmitted from the subframe 10, the filled member 9 contacts with the inner surface at both sides of the housing 8 in the vibrating direction, so that the damping character by the filled member 9 is exercised for plural resonances having different frequencies by the energy loss due to the sliding friction and the collision. In this manner, the large damping character occurring inside the housing 8 restrains the vibration of the housing 8, whereby the vibration of the subframe 10 is effectively restrained.

According to the vibration restraining apparatus for vehicle of this embodiment, since the damping character by the filled member 9 is exercised based on the energy loss due to the sliding friction and the collision when the filled member 9 contacts (abuts) with (onto) the inner surface of the housing 8, the vibration restraining apparatus can be lightened, the vibration damping operation does not have a temperature dependency, and the filed member 9 can exercise the vibration restraining effect for the plural resonances of different frequencies.

In addition, in the vibration restraining apparatus of this embodiment for vehicle, the filled member 9 is sealed in the inner space of the housing 8 so that the gap S is formed between the filled member 9 and the housing 8 in all directions, it can restrain the vibration in all directions of the housing 8 (sub frame).

Examination 2

For confirming the excellent advantage of the present invention, the vibration restraining apparatus of this embodiment is attached to a rear suspension of the automobile, and the hammering test is performed to examine the restraining characteristic.

Figure 17:
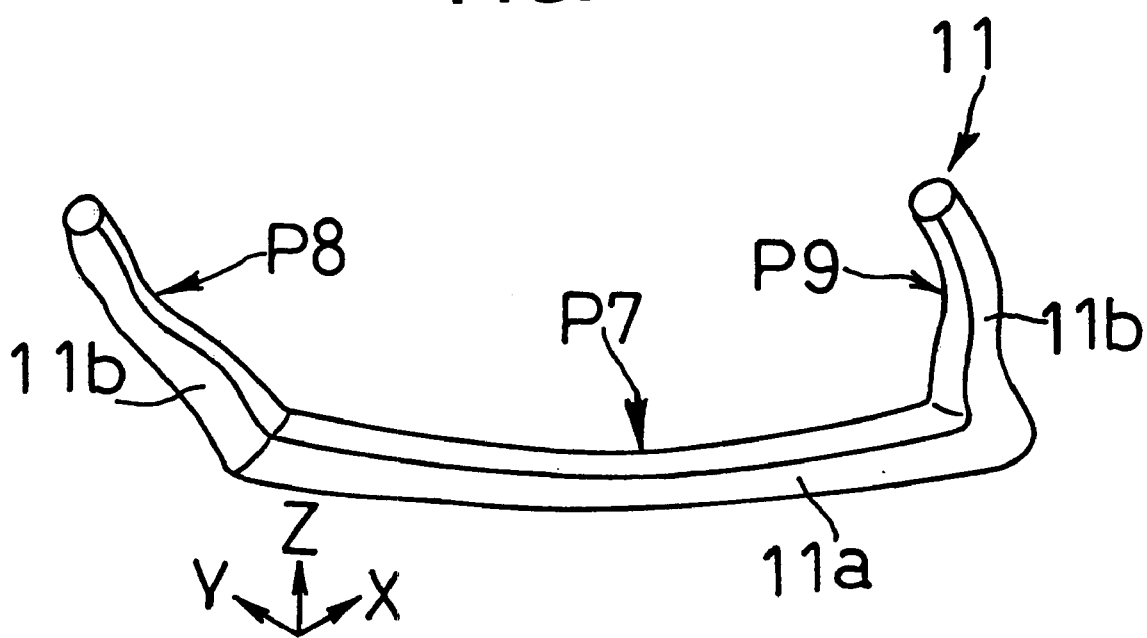
FIG. 17 is an explanatory view of a rear suspension arm used in an examination 2.

A rear suspension arm 11 used here is made of an aluminium alloy and includes, as shown in FIG. 17, a middle portion hla formed into a substantially linear shape, and a pair of arm portions 11b, 11b extending from both ends thereof in a bent state (total weight is 29 kg). At a central portion P7 of the middle portion (position forming an antinode of amplitude) of the rear suspension 11, and at central portions P8 and P9 of each of the arm portions 11b, 11b (position forming the antinode of amplitude), the vibration apparatus for vehicle (weight is 250 g) is attached respectively.

Figure 18:
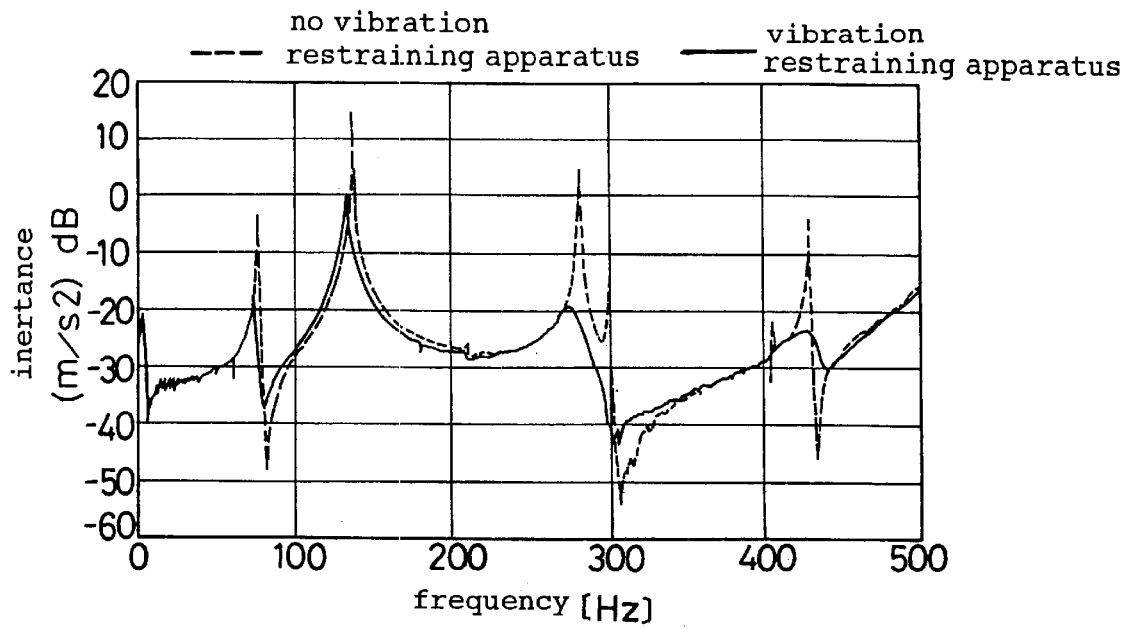
FIG. 18 is a graph showing a vibration damping characteristic in a Z-direction in the hammering test of examination 2.
Figure 19:
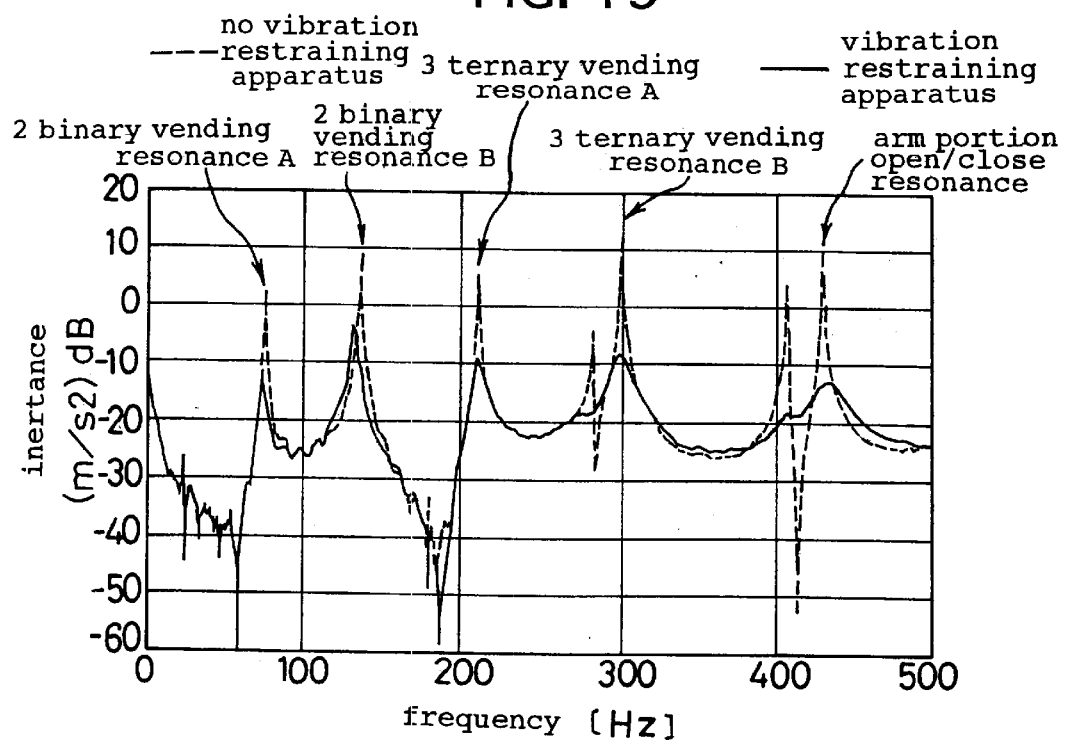
FIG. 19 is a graph showing a vibration damping characteristic in a Y-direction in the hammering test of examination 2.

Hammering tests on the suspension arm 11 have been carried out in a free supported state where the rear suspension arm 11 is suspended at the both end portions of each arm portions 11b, 11b (four portions in total) by straps, and the vibration damping characteristic is examined at the central portion P7 of the middle portion 11a in a Z-direction (upper/lower direction) and a Y-direction (left/right direction). A measured result in the Z-direction is shown in FIG. 18 by a solid line, and a measured result in the Y-direction is shown in FIG. 19 by a solid line. Here, the hammering test is similarly performed for the rear suspension arm 10 to which the above vibration restraining apparatus for vehicle is not attached, and measured results thereof are respectively shown in FIGS. 18 and 19 by dotted lines.

As apparent from FIGS. 18 and 19, in a frequency area up to 500 Hz, it can be confirmed that although many resonances of different frequencies such as binary-node bend resonance A and binary-node bend resonance B, ternary-node bend resonance A and ternary-node bend resonance B, and arm portion open/close resonance are generated, the peak levels of those resonances have been greatly reduced in all areas when the vibration restraining apparatus for vehicle is attached. Thus, it is confirmed the vibration restraining apparatus for vehicle of the present invention can obtain a vibration restraining effect in all resonance modes effectively.

Here, a total weight of the three vibration restraining apparatuses for vehicle is 750 g, whereas the weight of the rear suspension arm to which the vibration restraining apparatuses are attached is 29 kg, thus a weight ratio of the former to the latter being only about 2.6%. Accordingly, the vibration restraining apparatus for vehicle of the present invention can restrain the vibration with small increase of the weight, and the weight thereof is greatly lightened.

Embodiment 3

Figure 20:
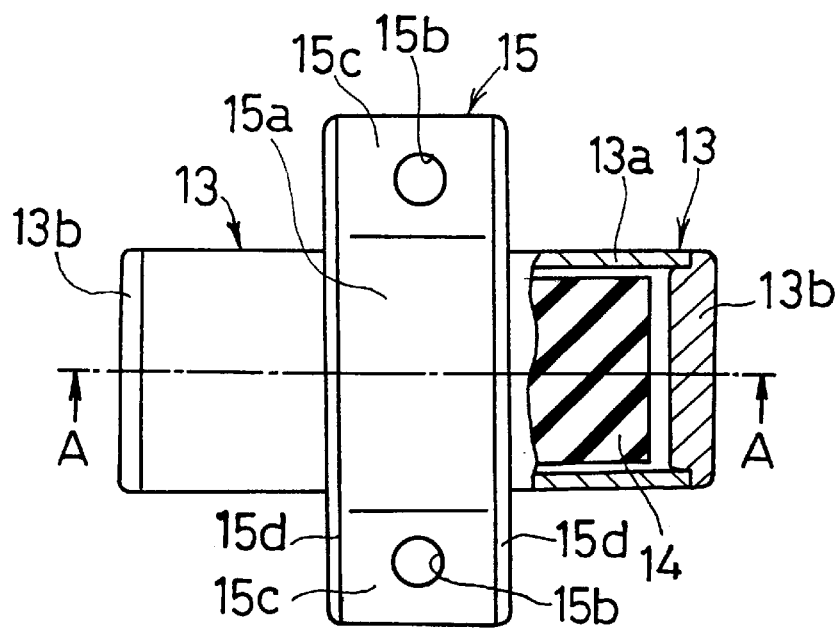
FIG. 20 is a partially broken plan view showing a vibration restraining apparatus for vehicle of this embodiment 3 according to the present invention.
Figure 21:
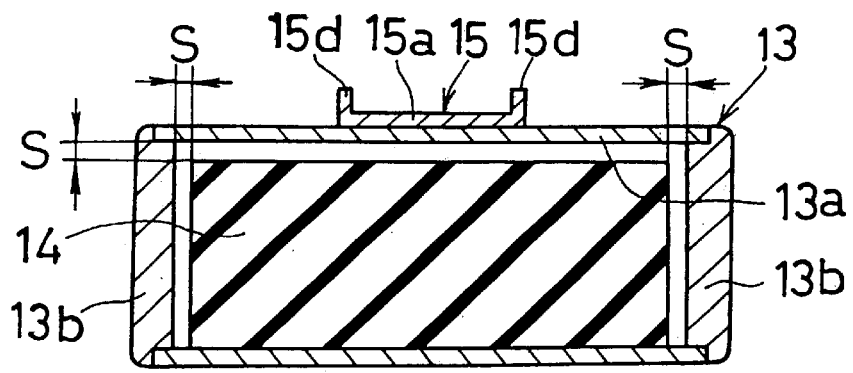
FIG. 21 is a cross-sectional view of the vibration restraining apparatus for vehicle of embodiment 3 according to the present invention and corresponding to a cross-sectional view taken along a line A—A in FIG. 20.

FIG. 20 is a partially broken plan view showing a vibration restraining apparatus for vehicle of this embodiment, and FIG. 21 is a cross-sectional view of the same taken along line A—A in FIG. 20.

The vibration restraining apparatus for vehicle of this embodiment is attached to a sub frame of an automobile, and has the same basic construction as that in the above embodiment 2, except for the provision of a bracket 15. That is, this vibration restraining apparatus for vehicle is, as shown in FIGS. 20 and 21, comprised of a housing 13 having an inner space, a filled member 14 filled in the inner space of the housing 13 in a non-adhered state with leaving a gap S, and a bracket 15 attached to the housing 13.

The housing 13 is comprised of a body portion 13a formed into a tubular shape having substantially constant diameter by an aluminium alloy, a pair of plug portions 13b, 13b made of an aluminium alloy and attached to both ends of the body portion 8a respectively by welding to seal openings. A closed inner space is formed inside the housing 13 by sealing both end openings by the body portion 13a by the pined plug portions 13b, 13b. This housing 13 has a elasticity rate of more than $5 \times 10^4$ MPa.

The whole filled ember 14 is constructed by a high specific gravity rubber formed by vulcanizing and forming a rubber compound in which a zinc oxide powder of 250 weight parts as a specific gravity increase material, peroxide of 3.5 weight parts as a vulcanizing agent, and adding agents such as a carbon black and a vulcanization promoting agent are mixed with natural rubber of 100 weight parts. This high specific gravity rubber has characteristics that density is 2.0 g/cm$^3$, and Shore A hardness is 54. This filled member 14 is formed into a circular pillar shape of diameter slightly smaller than diameter of the inner space of the housing 13 and sealed into the inner space in a non-adhered state. As a result, a gap S of about 0.3 mm is formed between the filled member 14 and the housing 13, so that the filled member 14 is disposed in the inner space to be freely moved.

The bracket 15 is comprised of a belt-like portion 15a formed to have U-shape cross-section, a pair of attachment seat portions 15c, 15c extending from both ends of the belt-like portion 15a to bend in opposite directions and having attachment holes 15b, 15b at middle portions thereof, and a pair of side wall portions 15d, 15d extending from the belt-like portion 15a and both side portions of the both attachment seat portions 15c, 15 to bend in the same directions. This bracket 15 is attached to an outer peripheral surface of the housing 13 by welding so that the belt-like portion 15a covers about a half of the outer peripheral surface along a circumferential direction thereof.

Figure 22:
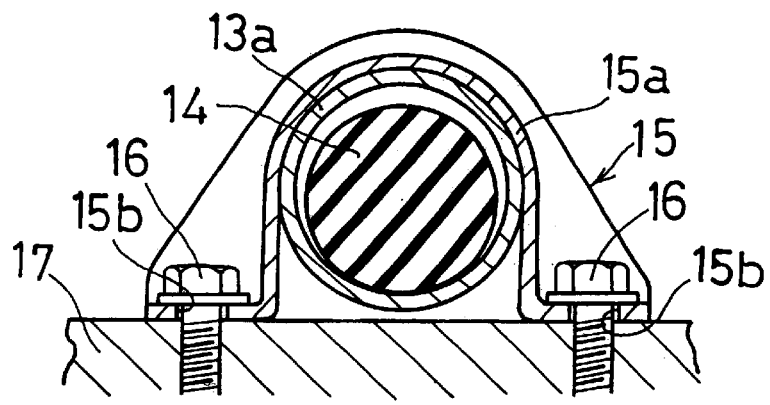
FIG. 22 is a cross-sectional view showing state where the vibration restraining apparatus for vehicle of embodiment 3 according to the present invention is attached to a subframe.

The vibration restraining apparatus for vehicle of this embodiment constructed as mentioned above is, as shown in FIG. 22, attached to a predetermined position on a sub frame 17 of an automobile by attachment bolts 16,16 inserted into each of the attachment holes 15b, 15b of the bracket 15.

During running of the automobile, when the housing 13 resonates by the vibration transmitted from the subframe 17, the vibration restraining apparatus for vehicle exercises in the same way as mentioned in the above embodiment 2. That is, the filled member 14 exercises the large damping effect for plural resonances having different frequencies based on the energy loss due to the sliding friction and the collision when it contacts (abuts) with (onto) the inner surfaces at both sides of the housing 13 in the vibration direction. In this way, vibration of the housing 13 is effectively restrained, whereby the vibration of the subframe 17 is effectively restrained.

Accordingly, in the vibration restraining apparatus for vehicle of this embodiment, the advantages same as that of the above embodiment 2 that the weight thereof is lightened, the vibration restraining operation does not have a temperature dependency, and the vibration restraining effect can be exercised for the resonances of different frequencies can be obtained.

Also, in the vibration restraining apparatus for vehicle of this embodiment, since the bracket 15 is provided on the housing 13 in advance, the vibration restraining apparatus can be attached to the subframe 17 easily.

Embodiment 4

Figure 23:
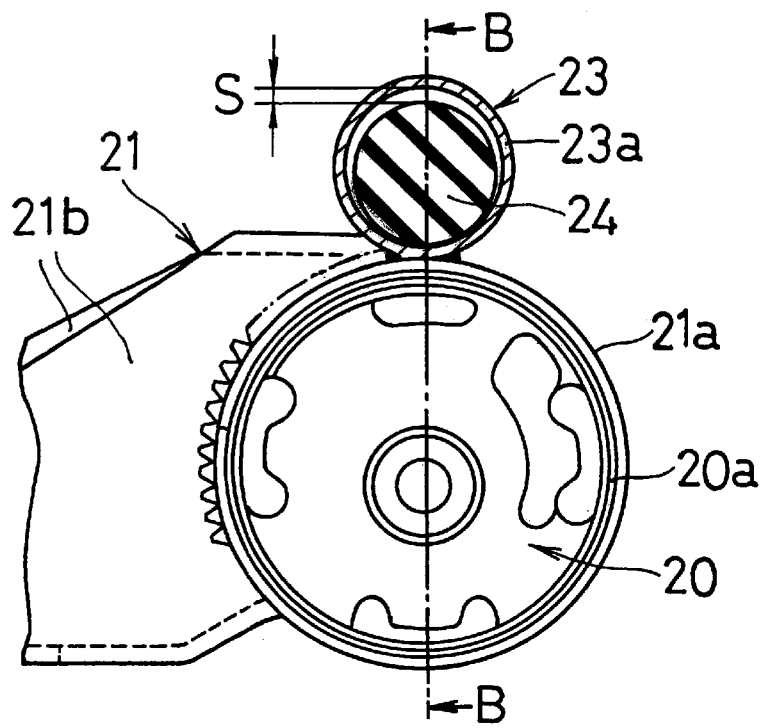
FIG. 23 is a cross-sectional view orthogonal to a shaft in state where a vibration restraining apparatus of an embodiment 4 according to the present invention is attached to an engine mount bracket and corresponds to the cross-sectional view taken along a line C—C in FIG. 24.
Figure 24:
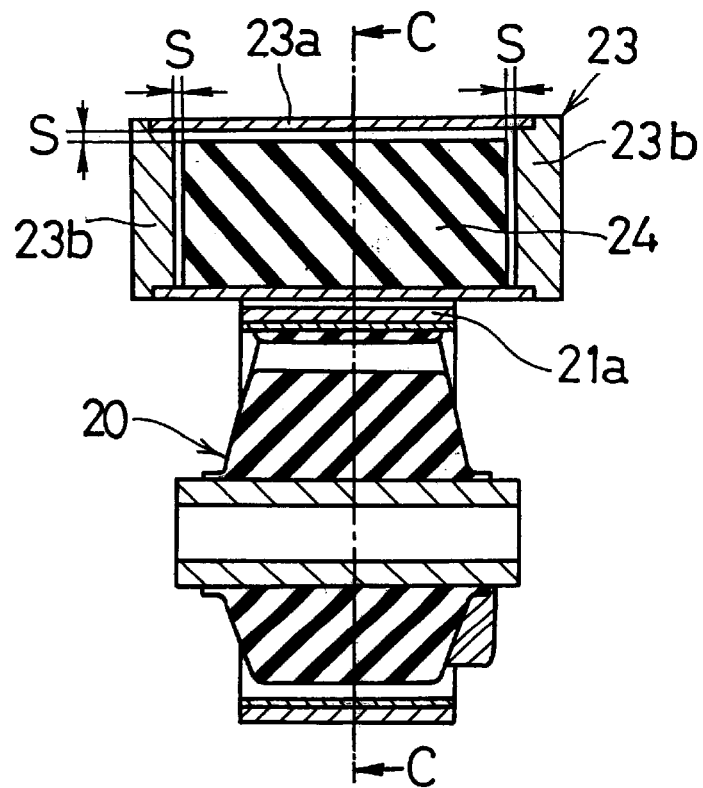
FIG. 24 a cross-sectional view along a shaft in state where the vibration restraining apparatus of embodiment 4 according to the present invention is attached to the engine mount bracket and corresponds to the cross-sectional view taken along line B—B in FIG. 23.

FIG. 23 is a cross-sectional view of a vibration restraining apparatus taken in a direction orthogonal to a shaft in state where the vibration restraining apparatus of this embodiment is attached to a mount bracket and corresponds to the cross-sectional view taken along line C—C in FIG. 24, and FIG. 24 a cross-sectional view taken along line B—B in FIG. 23.

The vibration restraining apparatus for vehicle of this embodiment is, as shown in FIGS. 23 and 24, attached to a mount racket 21 to which an engine mount 20 for an automobile is secured.

The mount bracket 21 includes a tubular portion 21a to which an outer tubular metal fitting 20a of the engine mount 20 is fitted, and a pair of attach arm portions 21b, 21b fixed to an outer peripheral surface of the tubular portion 21a by welding, and is wholly made of a steel plate.

The vibration restraining apparatus for vehicle of this embodiment is constructed by a housing 23 having an inner space and fixed to the tubular portion 21a of the mount bracket 21, and a filled member 24 sealed in the inner space of the housing 23 in a non-adhered state while leaving a gap S.

The housing 23 is comprised of a body portion 23a made of a steel iron formed into a tubular shape having substantially constant diameter, a pair of plug portions 23b, 23b made of a steel iron and attached to both ends of the body portion 23a respectively by welding to seal openings. A closed inner space is formed inside the housing 23 by sealing the both end openings of the body portion 23a by, the pair of plug portions 23b, 23b. This housing 23 has a elasticity rate more than $5 \times 10^4$ MPa. Here, the housing 23 is secured to the mount bracket 21 by welding in state where an outer peripheral surface of the body portion 23a is abutted onto an outer peripheral surface of the tubular portion 21a in an axial direction.

A filled member 24 is wholly constructed by a high specific gravity rubber formed by vulcanizing and forming a rubber compound in which a zinc oxide powder of 250 weight part as a specific gravity increase material, peroxide of 3.5 weight part as a vulcanizing agent, and adding agents such as a carbon black and a vulcanization promoting agent are mixed with natural rubber of 100 weight part. This high specific gravity rubber has characteristics such that density thereof is 2.0 g/cm$^3$, and Shore A hardness thereof is 54. This filled member 24 is formed into a circular pillar shape of diameter slightly smaller than diameter of the inner space of the housing 23 and sealed into the inner space in a non-adhered state. As a result, a gap S of about 0.3 mm is formed between the filled member 24 and the housing 23, so that the filled member 24 is disposed in the inner space to be freely moved.

In the vibration restraining apparatus for vehicle of this embodiment constructed as mentioned above, during operation of the engine installed into the automobile and running of the automobile, when the housing 23 resonates by the vibration transmitted from the mount bracket 21, the vibration restraining apparatus for vehicle exercises in the same way as mentioned in the above embodiments 1 to 3. That is, the filled member 24 exercises a large damping effect for plural resonances having different frequencies based on the energy loss due to the sliding friction and the collision when it contacts (abuts) with (onto) the inner surfaces at both sides of the housing 23 in the vibration direction. In this manner, vibration of the housing 23 is effectively restrained, whereby the vibration of the mount bracket 21 is effectively restrained.

Accordingly, in the vibration restraining apparatus for vehicle of this embodiment, the same advantages as that of the above embodiments 1 to 3 that the weight is lightened, the vibration restrain operation does not have the temperature dependency, and the vibration restraining effect can be exercised for the resonances of different frequencies can be obtained.

Embodiment 5

Figure 25:
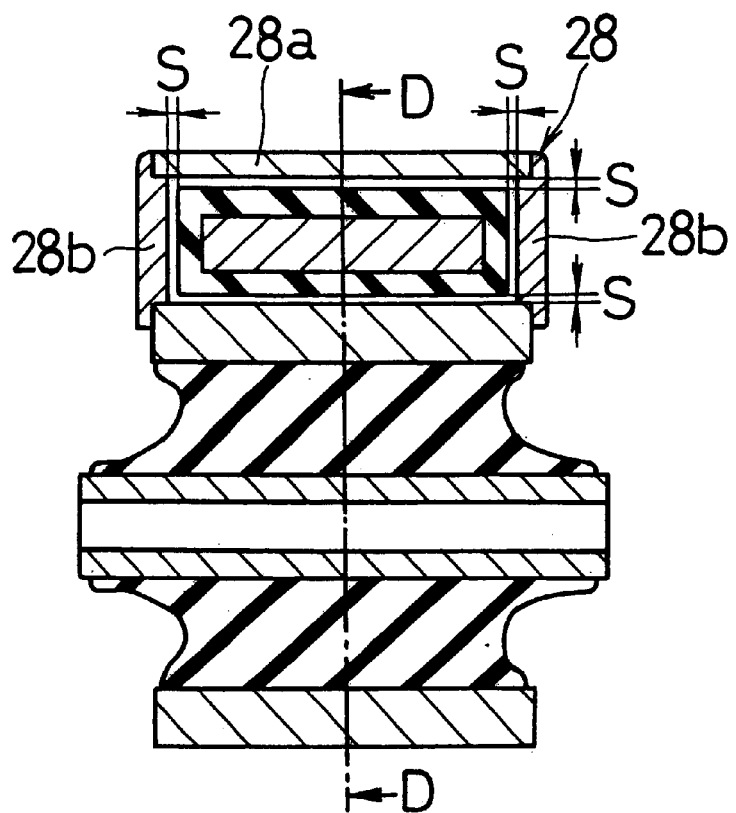
FIG. 25 is a cross-sectional view along a shaft of a vibration restraining apparatus for vehicle of an embodiment 5 of the present invention provided integral with a mount bracket and corresponds to the cross-sectional view taken along line E—E in the FIG. 26.
Figure 26:
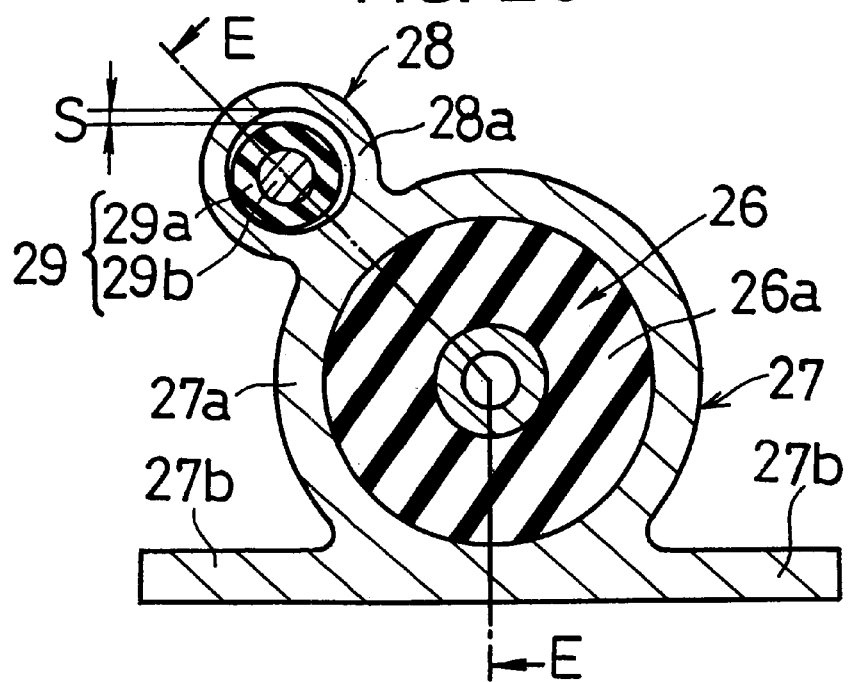
FIG. 26 is a cross-sectional view orthogonal to the shaft of the vibration restraining apparatus for vehicle of embodiment 5 of the present invention provided integral with the mount bracket and corresponds to the cross-sectional view taken along line D—D in FIG. 25.

FIG. 25 is a cross-sectional view of a vibration restraining apparatus for vehicle of this embodiment provided integrally with a mount bracket crossed along a shaft and corresponds to the cross-sectional view taken along a line E—E in the FIG. 26, and FIG. 26 is a cross-sectional view taken along a line D—D in FIG. 25.

The vibration restraining apparatus for vehicle of this embodiment is, as shown in FIGS. 25 and 26, provided integral with a mount bracket 27 to which an engine mount 26 for the automobile is secured. The mount bracket 27 includes a tubular portion 27a to which a rubber elastic body 26a of the engine mount 26 is fixed, and a pair of attached seat portions 27b, 27b extending from an outer peripheral surface of the tubular portion 27a in opposite directions, and is wholly formed integrally by extrusion-formed body by an aluminium alloy.

The vibration restraining apparatus for vehicle of this embodiment is constructed by a housing 28 provided integrally with the mount bracket 27, and a filled member 29 sealed in an inner space of the housing 28 in a non-adhered state while leaving a gap S.

The housing 28 includes a tubular body portion 28a formed integrally with an outer peripheral portion of the tubular portion 27a in extrusion-forming the mount bracket 27, a pair of plug members 28b, 28b made of an aluminium alloy and fixed to both ends of the body portion 28a by welding to seal openings. A closed inner space is formed inside of the, housing 28. This housing 28 has an elasticity rate more than $5 \times 10^4$ MPa.

The filled member 29 is comprised of an elastic body 29a made of high specific gravity rubber, and an assist mass 29b made of an steel iron and buried inside of the elastic body 29a. A filled member 29 is wholly constructed by a high specific gravity rubber formed by vulcanizing and forming a rubber compound in which a zinc oxide powder of 250 weight part as a specific gravity increase material, peroxide of 3.5 weight part as a vulcanizing agent, and adding agents such as a carbon black and a vulcanization promoting agent are mixed with natural rubber of 100 weight part. This high specific gravity rubber has characteristics such that density thereof is 2.0 g/cm$^3$, and the Shore A hardness thereof is 54. This filled member 29 is formed into a circular pillar shape of diameter slightly smaller than diameter of the inner space of the housing 28 and sealed into the inner space in a non-adhered state. As a result, a gap S of about 0.3 mm is formed between the filled member 29 and the housing 28, so that the filled member 28 is disposed in the inner space to be freely moved.

In the vibration restraining apparatus for vehicle of this embodiment constructed as mentioned above, when the housing 28 resonates by the vibration transmitted from the mount bracket 27 during operation of the engine installed into the automobile and running of the automobile, the vibration restraining apparatus for vehicle exercises in the same way as mentioned in the above embodiment 4. That is, the large damping character by the filled member 29 is exercised for plural resonances having different frequencies by the energy loss due to the sliding friction and the collision caused by contact of the filled member 29 with the inner surface of the housing 28. In this way, the vibration of the housing 28 is effectively restrained, whereby the vibration of the mount bracket 27 is effectively restrained.

Accordingly, in the vibration restraining apparatus for vehicle of this embodiment, the same advantages as that of the above embodiment 4 is obtained in that the weight is lightened, the vibration restrain wig operation does not have the temperature dependency, and the vibration restraining effect can be exercised for the resonances of different frequencies can be obtained.

In the vibration restraining apparatus for vehicle of this embodiment, since the body portion 28a of the housing 28 is formed integrally with the outer peripheral portion of the tubular portion 27a in extrusion-forming the mount bracket 27, an attachment of the housing 28 to the bracket 27 becomes unnecessary. Also, the vibration restraining apparatus can be manufactured easily to reduce the cost.

Examination 3

For confirming the excellent advantage of the present invention, the hammering test is performed by changing weight of the vibration restraining apparatus for vehicle attached to the mount bracket (vibration transmitting member) variously and the vibration damping character in the case where the weight ratio (mass ratio) of the vibration restraining apparatus for vehicle relative to the mount bracket is changed is examined.

Figure 27:
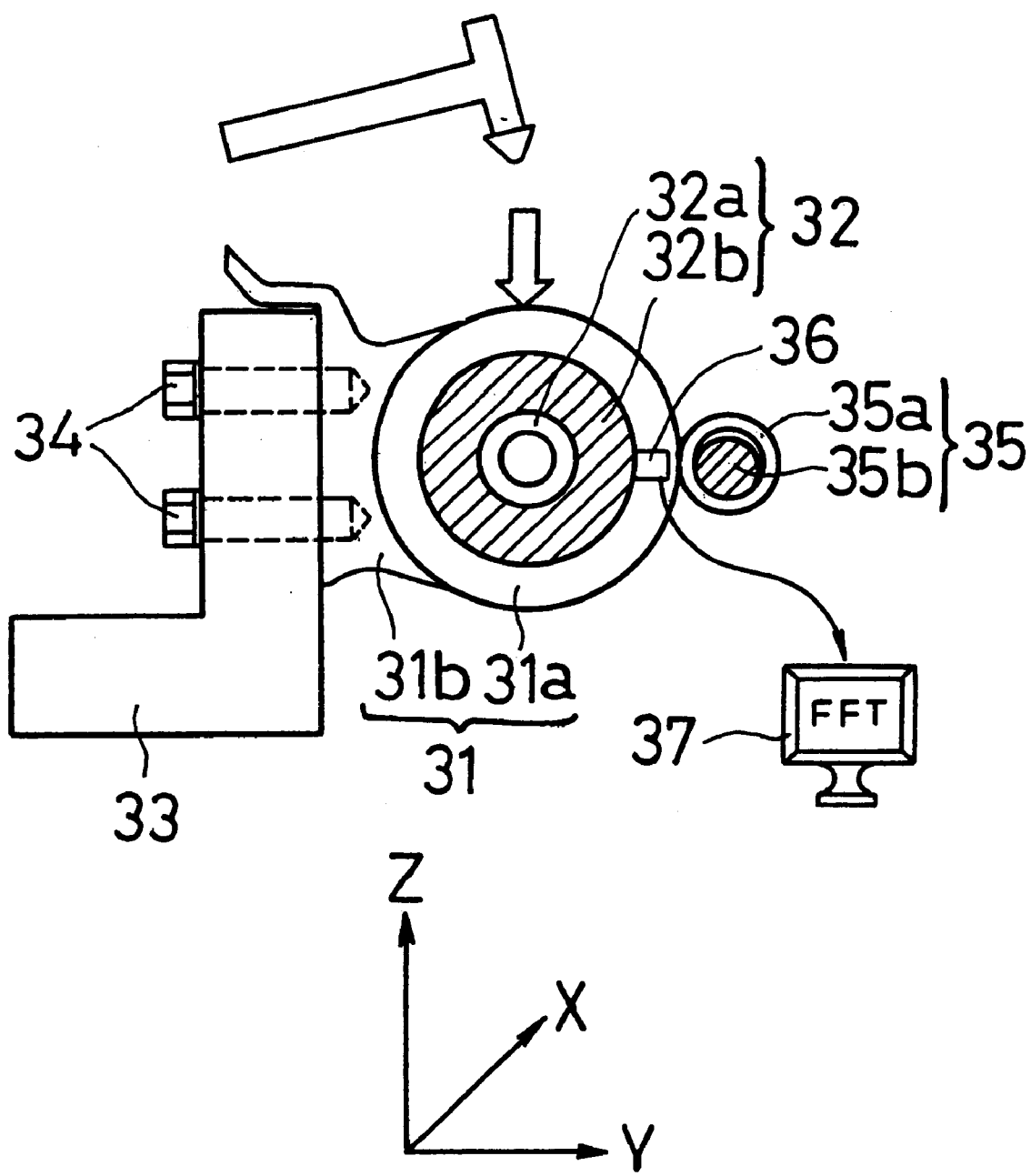
FIG. 27 is an explanatory view showing an examining machine used in an examination 3.

The mount bracket 31 used here is, as shown in FIG. 27, comprised of a tubular portion 31a and an attach seat portion 31b attached to an outer periphery of the tubular portion 31a integrally, and is wholly made of an aluminium alloy to have the weight of 258 g. To tubular portion 31a of the mount bracket 31, a mount 32 including an inner tubular metal fitting 32a and a rubber resilient body 32b is fitted. A total weight of the mount bracket 31 and the mount 32 is, 594 g. This mount bracket 31 is fixed to a fix jig 33 at the attach seat portion 31b thereof by bolts 34 by a fasten torque of 6 kgf/cm.

The vibration restraining apparatus 35 for a vehicle of the present invention is fixed to the outer peripheral surface of the tubular portion 31a of the mount bracket 31 is constructed by a housing 35a made of an aluminium alloy and filled member 35b made of a high specific gravity rubber is utilized and sealed in the inner space of the housing 35a while leaving a gap (0.3 mm). Three vibration restraining apparatuses for vehicle each having the weight of 32.3 g (weight ratio: 5%), the weight of 64.7 g (weight ratio: 10%) and the weight of 97 g (weight ratio: 15%) are prepared.

The hammering test to the mount bracket 31 is conducted for each case where three kinds of vibration restraining apparatuses for vehicle 35 having different weights is changed, and the vibration level for each case is measured by the fast fourrier transfer (FFT) 37 based on output of a sensor 36 attached to one end surface of the tubular portion 31a. The vibration level is measured in a Y-direction and a Z-direction respectively corresponding to a left/right direction and an upper/lower direction when the moment bracket 31 is viewed in the axial direction. The measured result of the vibration level in the frequency of 290 Hz occurring in the Y-direction is shown in FIG. 28, and the measured result of the vibration level in the frequency of 470 Hz occurring in the Z-direction is shown in FIG. 29.

Figure 28:
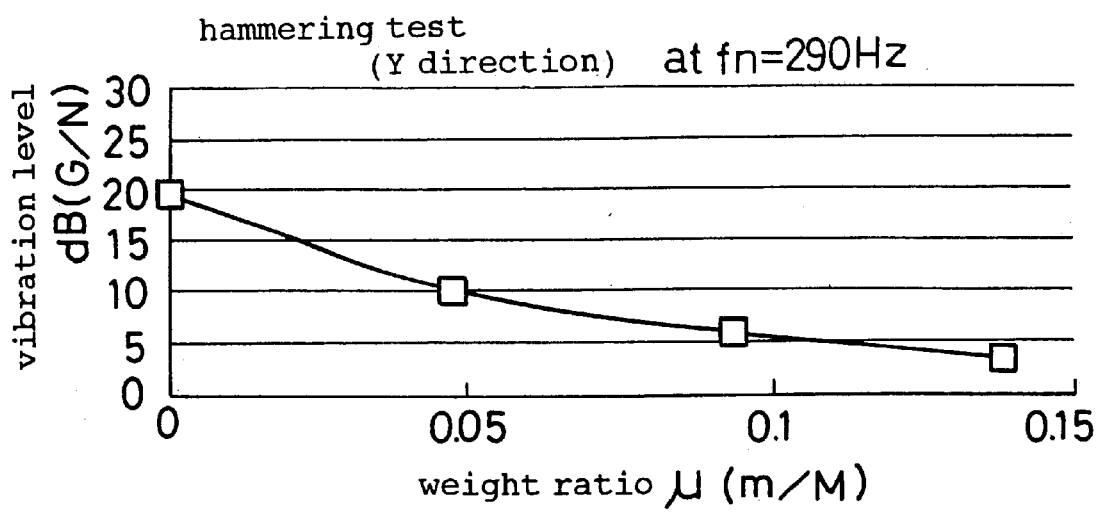
FIG. 28 is a graph showing the result of a hammering test in examination 3 in the Y-direction.

As apparent from FIG. 28, it is confirmed the vibration level of 20 dB in the case where the vibration restraining apparatus for vehicle is not attached is, reduced down to 10 dB which is half of the above vibration level in the case of the weight ratio of 5%. Also confirmed is that the vibration level is greatly reduced down to about 6 dB in the case of the weight ratio of 10%, and down to about 3 dB in the case of the weight ratio of 15% respectively.

Figure 29:
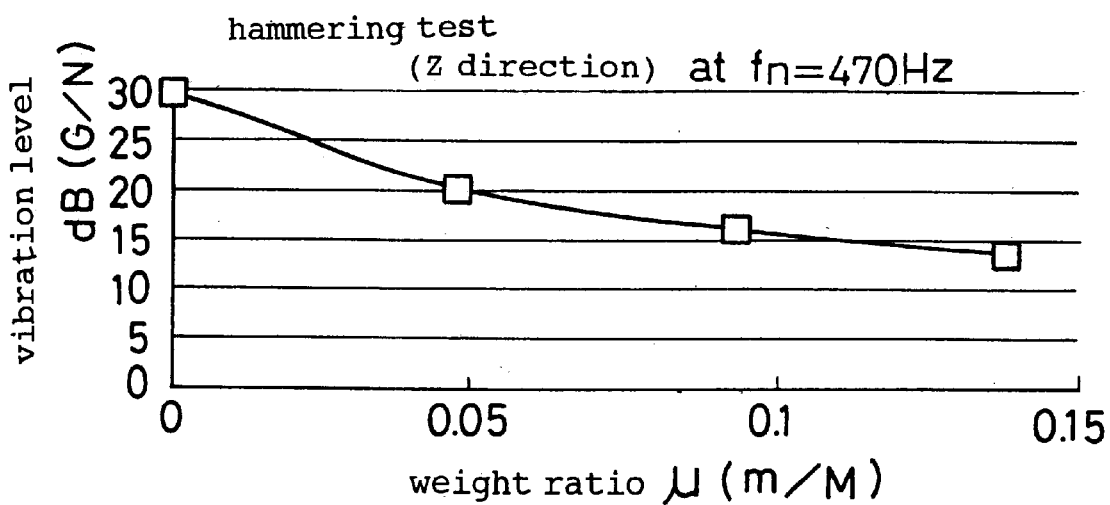
FIG. 29 is a graph showing the result of the hammering test in examination 3 in the Z-direction.

Also, as apparent from FIG. 29, it is confirmed the vibration level of 30 dB in the case where the vibration restraining apparatus for vehicle is not attached is, reduced down to 20 dB which is about two-third of the above vibration level in the case of the weight ratio of 5%. Also confirmed is that the vibration level is greatly reduced down to about 17 dB in the case of the weight ratio of 10%, and down to about 13 dB in the case of the weight ratio of 15 respectively.

Judging from the above results, it is confirmed that the vibration can be reduced greatly by attaching the vibration restraining apparatus 35 for a vehicle of the present invention to the mount bracket 31, and sufficient and satisfactory vibration restraining effect can be obtained even in the case of the weight ration 5%. Thus, the vibration restraining apparatus for vehicle 35 of the present invention can realize the excellent vibration restraining effect by small increase of the weight, and an lighten the weight greatly.

Embodiment 6

Figure 30:
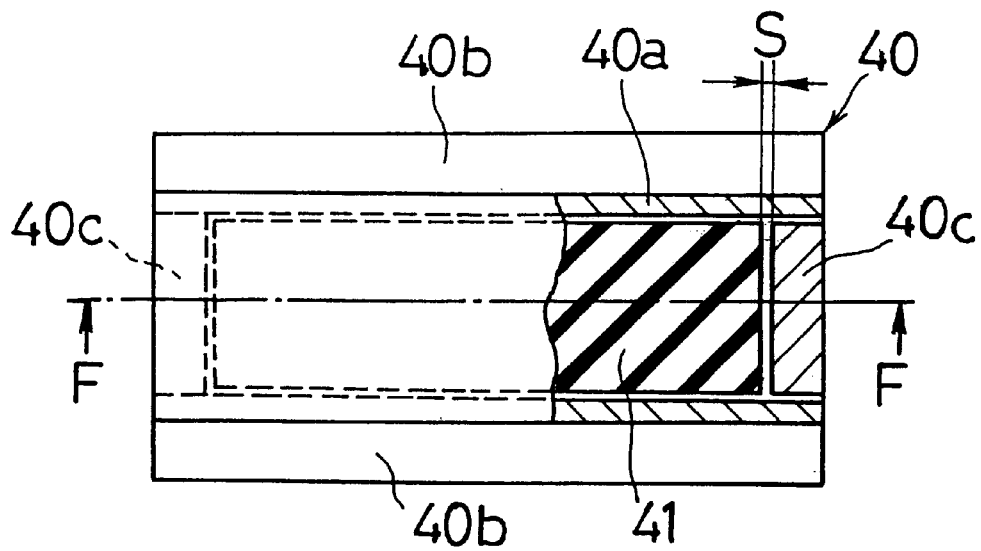
FIG. 30 is a partially broken plan view showing a vibration restraining apparatus for vehicle of an embodiment 6 according to the present invention.
Figure 31:
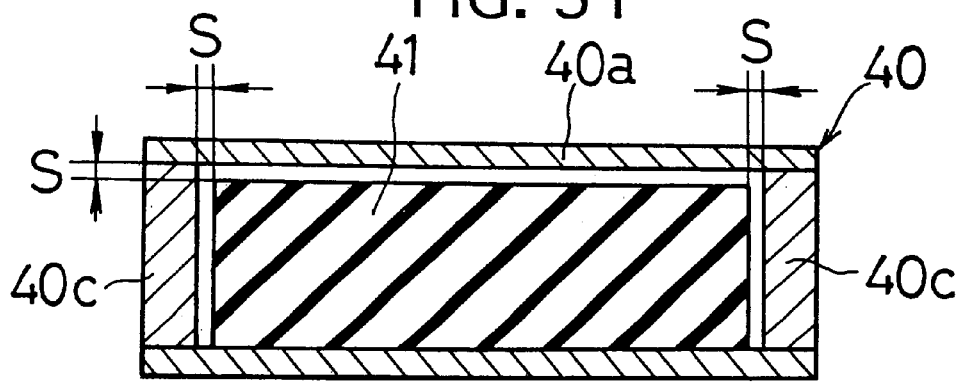
FIG. 31 is a cross-sectional view of the vibration restraining apparatus for vehicle of embodiment 6 according to the present invention and corresponds to the cross-sectional view taken along line F—F in FIG. 30.

FIG. 30 is a partially broken plan view showing a vibration restraining apparatus for vehicle of this embodiment, and FIG 31 is a cross-sectional view of the same taken along a line F—F in FIG. 30.

The vibration restraining apparatus for vehicle of this embodiment is attached to a body panel such as a dashpanel, roof panel and floor panel defining a vehicle room or compartment of the automobile. This vibration restraining apparatus for vehicle is, as shown in FIGS. 30 and 31, constructed by a housing 40 made of a resin and having an inner space, and a filled member 41 sealed in the inner space of the housing 40 in a non-adhered state whole leaving a gap S.

The housing 40 includes a body portion 40a formed into a tubular shape of substantially constant diameter, a pair of attach seat portions 40b, 40b extending from an outer peripheral surface of the body portion 40a in a leg-fashion, and a pair of plug members 40c, 40c respectively connected to both ends of the body portion 40a by a vibrating melt-welding to seal openings. This housing 40 is made of nylon 66 containing glass fibers by 30 weight %. A closed inner space is formed inside of the housing 40. This housing 40 has the elasticity rate more than $5 \times 10^4$ MPa.

A filled member 41 is wholly constructed by a high specific gravity rubber formed by vulcanizing and forming a rubber compound in which zinc oxide powder of 250 weight parts as a specific gravity increase material, peroxide of 3.5 weight parts as a vulcanizing agent, and adding agents such as a carbon black and a vulcanization promoting agent are mixed with natural rubber of 100 weight parts. This high specific gravity rubber has characteristics that density is 2.0 g/cm$^3$, and Shore A hardness is 54. This filled member 41 is formed into a circular pillar shape of diameter slightly smaller than diameter of the inner space of the housing 40 and sealed into the inner space in a non-adhered state. As a result, a gap S of about 0.3 mm is formed between the filled member 41 and the housing 40, so that the filled member 41 is disposed in the inner space to be freely moved.

Figure 32:
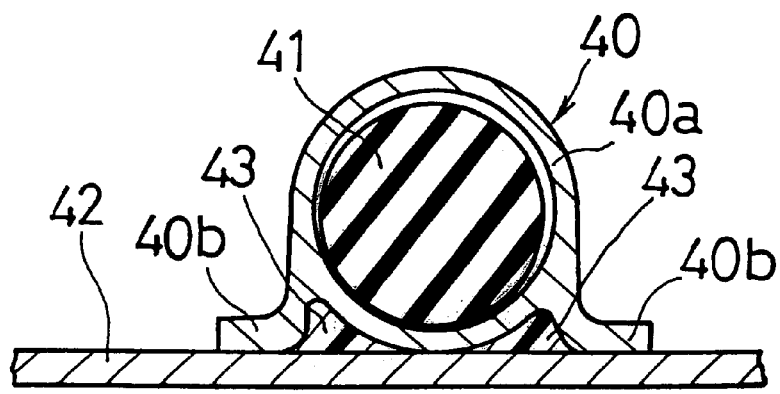
FIG. 32 is a cross-section view showing state where the vibration restraining apparatus for vehicle of embodiment 6 of the present invention is attached to a body panel.

The vibration restraining apparatus for vehicle of this embodiment is, as shown in FIG. 32, adhered to a predetermined position of a dashpanel 42 etc. of the automobile for use by an adhering agent 43 coated on a part located between both attach seat portions 40b, 40b of the housing 40. Here, the vibration restraining apparatus for vehicle is preferably attached to the dashpanel 42 at a position where a max. amplitude will occur when the dashpanel 42 vibrates (position forming an antinode of amplitude) in a direction coinciding with a max. amplitude direction.

When the housing 40 resonates by the vibration transmitted from the dashpanel 42 during running of the automobile, the filled member 41 contacts with the inner surface of the housing 40 at both sides in the vibrating direction to exercise the damping character for plural resonances having different frequencies based on the energy loss due to the sliding friction and the collision. In this way, the large damping character is generated in the housing 40 to restrain vibration thereof, whereby the vibration of the dashpanel 42 is effectively restrained. Also, the vibration restrain of the dashpanel 42 increases the sound or noise insulating function of the dashpanel 42 for noise transmitted from the exterior or the engine room to the vehicle room.

Thus, the vibration restraining apparatus for vehicle of this embodiment can exercise the damping character based on the energy loss due to the sliding friction and the collision caused by contact of the filled member 41 with the inner surface of the housing 40. So, the weight can be lightened, the vibration restraining effect does not have the temperature dependency, and the vibration restraining effect can be exercised for plural resonances having the different frequencies. Especially, in the vibration restraining apparatus for vehicle of this embodiment, the housing 40 formed by the resin enables to lighten the weight.

In addition, the vibration restraining apparatus for vehicle of this embodiment is attached for use to the dashpanel 42 defining the vehicle room, so it can increase the noise insulate function of the dashpanel 42 by effective vibration restrain thereof. For this reason, this vibration restraining apparatus can be suitably used also for a bonnet covering the engine room of the vehicle.

Examination 4

For confirming the excellent advantage of the present invention, an examination to compare a vibration restrain character of the vibration restraining apparatus of vehicle of this embodiment and that of a prior vibration restraining member has been performed.

Figure 33:
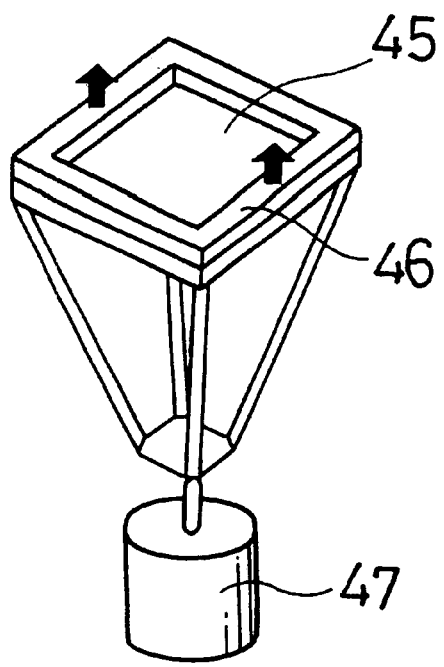
FIG. 33 is a perspective view showing an examining machine used in an examination 4.
Figure 34:
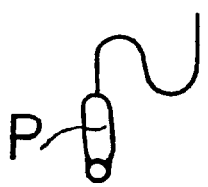
FIG. 34 is an explanatory view showing a measuring method of the examining machine used in examination 4.
Figure 34:
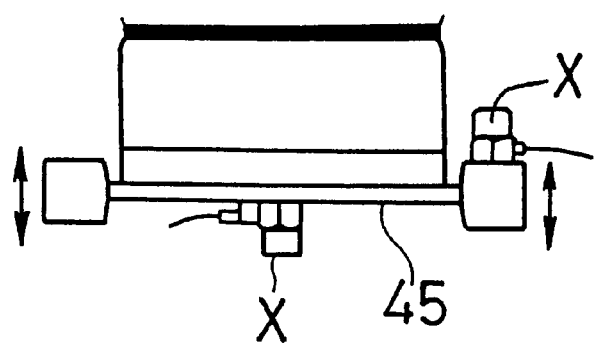

As the prior vibration restraining member, an asphalt sheet having thickness of 3.0 mm, sides of 480 mm×380 mm, and total weight of 780 g is used. The vibration restraining apparatus for vehicle of the present invention has total weight of 290 g including the housing weight of 55 g and the filled member weight of 235 g. An examining machine used for this examination is, as shown in FIG. 33, comprised of a base panel 45 made of an iron plate having thickness of 1.6 mm, sides of 600 mm×500 mm, a frame 46 holding the base panel 45, and a vibration apply device 47 suspended from the frame 46. As shown in FIG. 34, two sensors x, x to detect the vibration up to frequency of 600 Hz are set at a middle portion on a rear surface (lower surface) of the base panel 45 and a side portion of the frame 46, respectively. On an front surface (upper surface) of the base panel 45 a microphone P is set spaced from the base panel 45 by predetermined distance.

Figure 35:
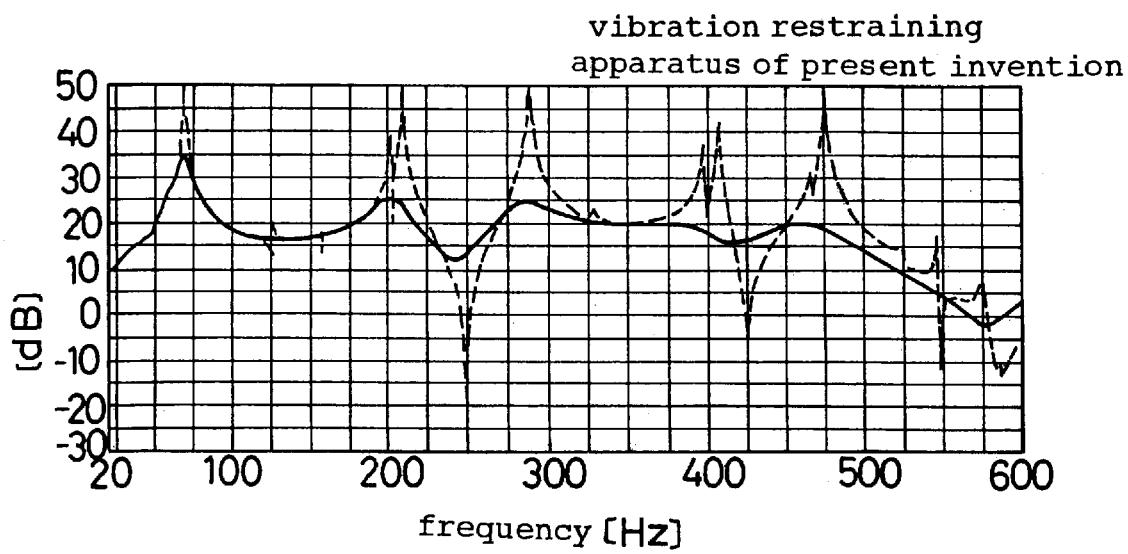
FIG. 35 is a graph showing a vibration damping characteristic of the vibration restraining apparatus for vehicle of the present invention in examination 4.
Figure 36:
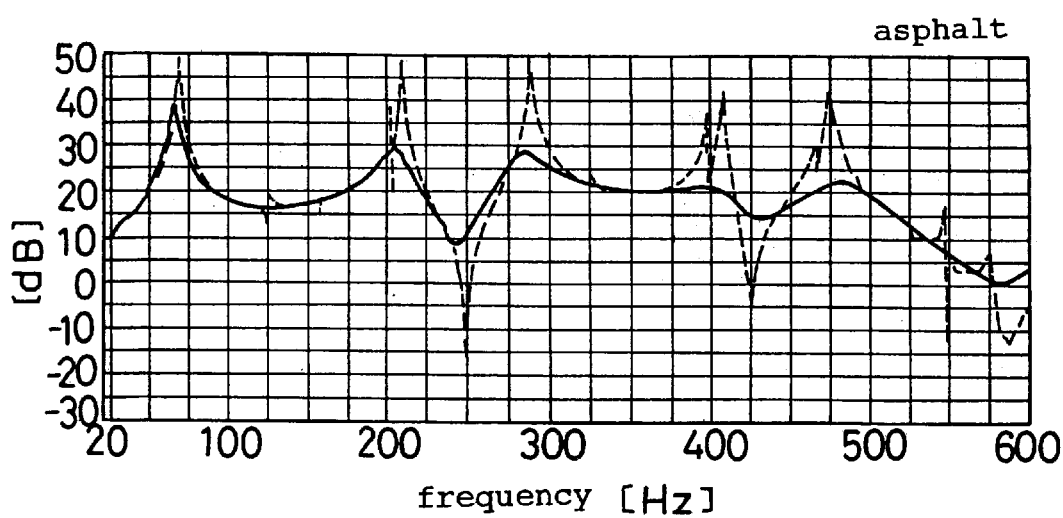
FIG. 36 is a graph showing a vibration damping characteristic of a conventional vibration restraining member (asphalt) in examination 4.

The vibration restraining apparatus for vehicle or the asphalt (vibration restraining member) is attached to the front surface of the base panel 45 of this examining machine and vibrated by the vibration applying device 47, and the vibration characteristic of the base panel 45 and the frame 46 is measured by the sensors X, X. The measured result of the vibration restraining apparatus for vehicle of the present invention is shown in FIG. 35 by solid line, while the measured result of the asphalt (vibration restraining member) is shown in FIG. 36 by solid line. In both of FIGS. 35 and 36, the measured results of the examination performed in the condition where the vibration restraining apparatus or the vibration restraining member is not attached are shown by dotted lines.

As apparent from FIGS. 35 and 36, it is confirmed in both case where the vibration restraining apparatus for vehicle of the present invention is attached and the case where the asphalt is attached, the peak levels of the resonance occurred in the plural frequency areas have been satisfactorily reduced, and the vibration restraining apparatus and the asphalt have substantially equivalent vibration restraining effect.

Figure 37:
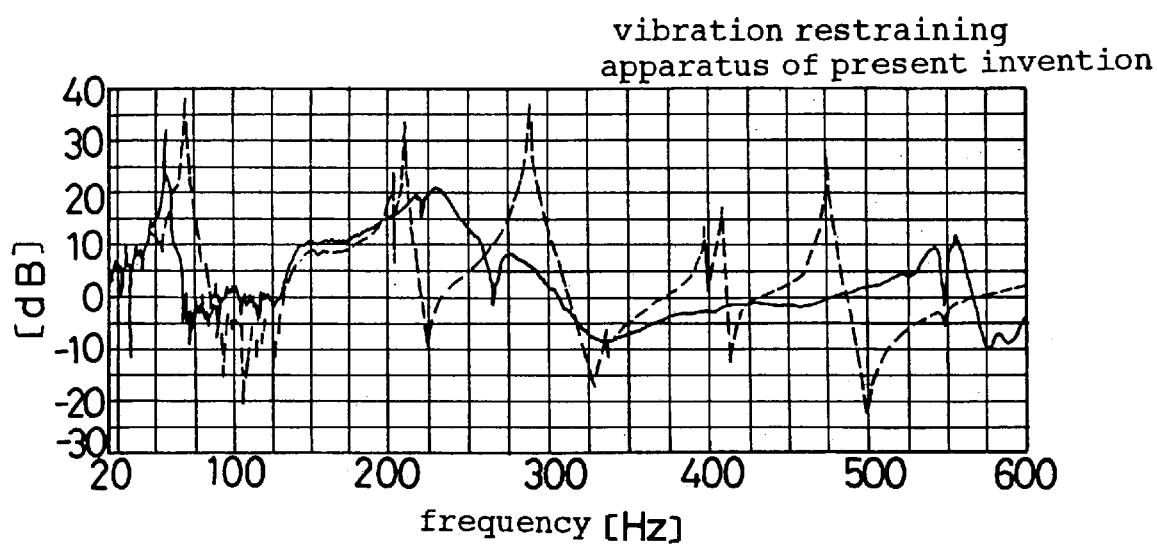
FIG. 37 is a graph showing a sound damping characteristic of the vibration restraining apparatus for vehicle of the present invention in examination 4.
Figure 38:
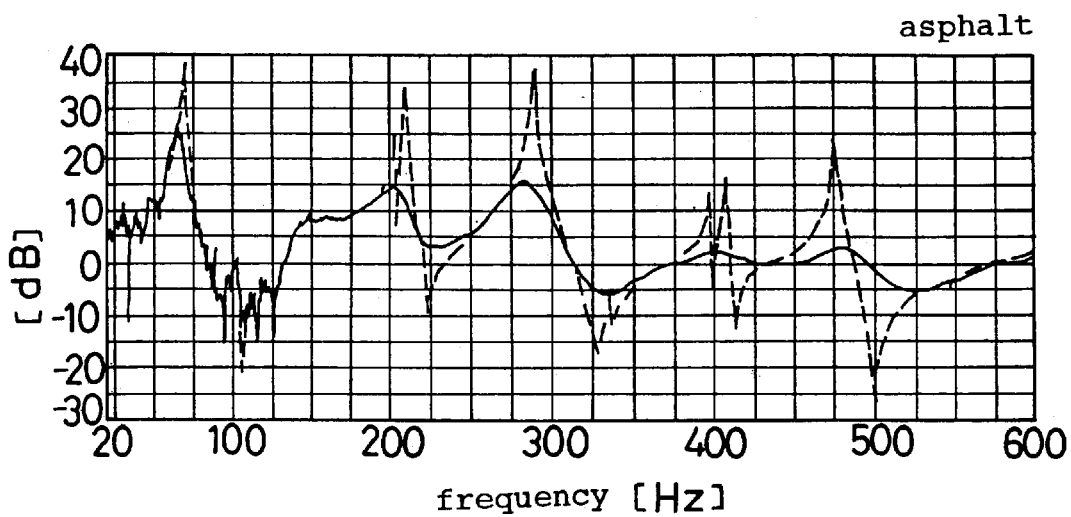
FIG. 38 is a graph showing the sound damping characteristic of a conventional vibration restraining member (asphalt) in examination 4.

At the same time, a sound characteristic transmitted from the rear surface side to the front surface side of the base panel 45 when the vibration apply device 47 applies the vibration is measured by the microphone P. The measured result of the vibration restraining apparatus for vehicle of the present invention is shown in FIG. 37 by solid line, while the measured result of the asphalt (vibration restraining member) is shown in FIG. 38 by solid line. In both of FIGS. 37 and 38, the measured results of the examination performed in the condition where the vibration restraining apparatus or the vibration restraining member is not attached are shown by dotted lines.

As apparent from FIGS. 37 and 38, it is confirmed in both case where the vibration restraining apparatus for vehicle of the present invention is attached and case where the asphalt is attached, the peak levels of sound or noise occurred in the plural frequency areas have been satisfactorily reduced, and the vibration restraining apparatus and the asphalt have substantially equivalent sound insulating or preventing effect.

From the above, it is confirmed that the vibration restraining apparatus for vehicle of the present invention and the asphalt have substantially equivalent sound shutting or insulating effect. However, the asphalt has total weight of 780 g while the vibration restraining apparatus for vehicle of the present invention has total weight of 290 g, which is about one third of the asphalt. Accordingly, the vibration restraining apparatus for vehicle of the present invention can be lightened greatly.

Here, the vibration restraining effect of the asphalt may be deteriorated when the environmental temperature rises or falls, but the vibration restraining apparatus for vehicle of the present invention does not suffer from such deterioration and does not have the temperature dependency.

Embodiment 7

Figure 39:
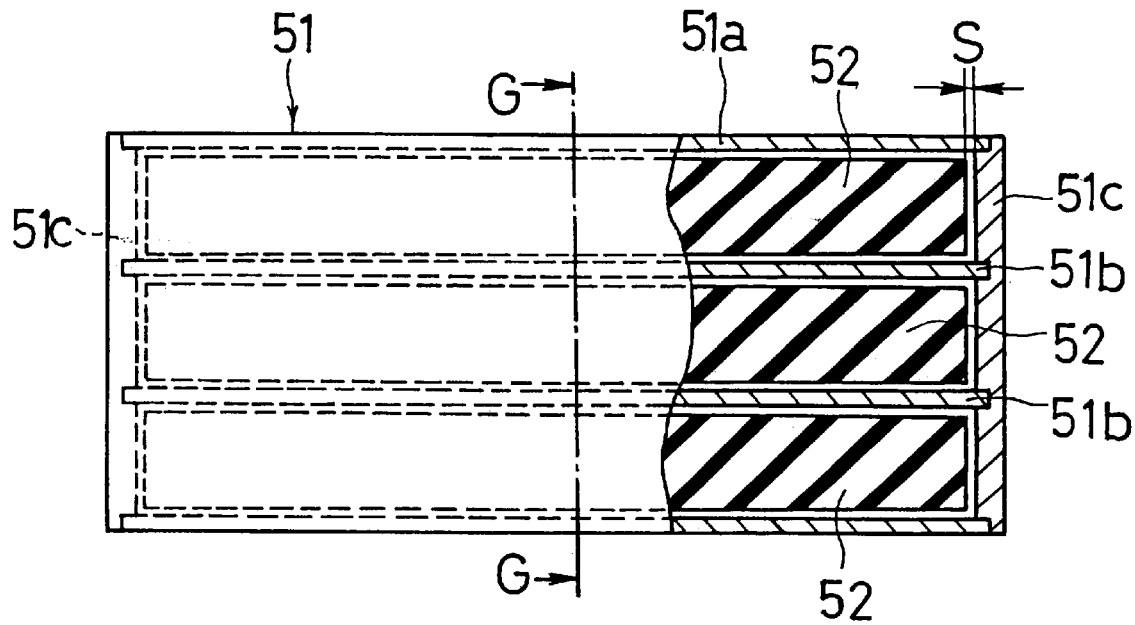
FIG. 39 is a partially broken plan view showing a vibration restraining apparatus for vehicle of an embodiment 7 according to the present invention.
Figure 40:
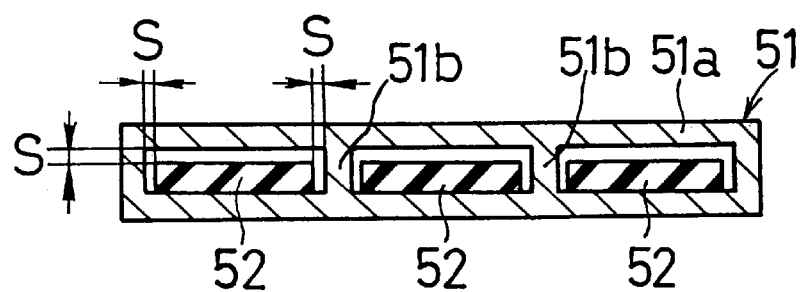
FIG. 40 is a cross-sectional view of the vibration restraining apparatus for vehicle of embodiment 7 according to the present invention and corresponds to the cross-sectional view taken along line G—G in FIG. 39.

FIG. 39 is a partially broken plan view showing a vibration restraining apparatus for vehicle of this embodiment, and FIG. 40 is a cross-sectional view of the same taken along a line G—G in FIG. 39.

The vibration restraining apparatus for vehicle of this embodiment is attached to a body panel such as a dashpanel, roof panel and floor panel defining a vehicle room. This vibration restraining apparatus for vehicle is, as shown in FIGS. 39 and 40, constructed by a housing 51 made of an aluminium alloy having three inner spaces, and filled members 52 respectively sealed in the inner space of the housing 51 in a non-adhered state with leaving a gap S.

The housing 51 is formed into a thin plate shape by a square tubular member and including a body portion 51a having three inner spaces formed by partitioning thin square tubular wall by two partition walls 51b, 51b extending axially, and three sets of paired plug members 51c, 51c respectively fixed to both ends of the body portion 51a by welding to seal openings of each inner space. The body portion 51a is formed by an extrusion-formed member made of an aluminium alloy, and the two partition walls 51b, 51b are integrally formed in the extrusion-forming. Three inner spaces of the housing 51 are closed by the plug members 51c, 51c. This housing 51 has the elasticity rate more than $5 \times 10^4$ MPa.

A filled member 52 is wholly constructed by a high specific gravity rubber formed by vulcanizing and forming a rubber compound in which a zinc oxide powder of 250 weight parts as a specific gravity increase material, peroxide of 3.5 weight parts, as a vulcanizing agent, and adding agents such as a carbon black and a vulcanization promoting agent is mixed with natural rubber of 100 weight parts. This high specific gravity rubber has characteristics that density thereof is 2.0 g/cm³, and Shore A hardness thereof is 54. Each of the filled members 52 is formed into a flat plate shape of size slightly smaller than size of the inner space of the housing 51 and sealed into the inner spaces in a non-adhered state. As a result, a gap S of about 0.3 mm is formed between the filled member 52 and the housing 51, so that the filled members 52 are disposed in each of the inner spaces to be freely moved.

Figure 41:
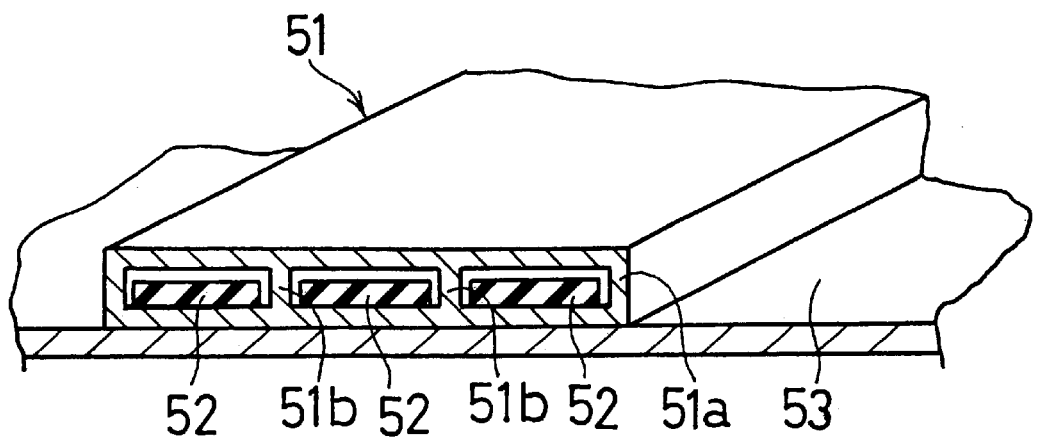
FIG. 41 is a cross-sectional view showing state where the vibration restraining apparatus for vehicle of embodiment 7 according to the present invention is attached to a body panel.

The vibration restraining apparatus for vehicle of this embodiment is, as shown in FIG. 41, adhered to a predetermined position of a floor panel 53 etc. of the automobile by an adhesive agent at a rear surface of the housing 51. Here, the vibration restraining apparatus for vehicle is preferably attached to the floor panel 53 at a position where a max. amplitude will occur when the floor panel 53 vibrates (position forming an antinode of amplitude) in a direction coinciding with a max. amplitude direction.

During operation of an engine installed on the automobile or running of the automobile, when the housing 51 resonates by the vibration transmitted from the floor panel 53, the vibration restraining apparatus performs the operation and effect same as that of the above embodiment 6. That is, the vibration restraining apparatus exercises the great damping character for the plural resonances having different frequencies, based on the energy loss caused by the sliding friction and collision in abutment of the filled members 52 sealed in each of the inner spaces of the housing 51 to an inner surface of the housing 51. In this case, larger a damping character can be obtained since three inner spaces in which the filled members 52 are sealed are formed in the housing 51. As result of the effective vibration restrain of the housing 51, the vibration of the floor panel 53 is effectively restrained. The vibration restrain of the floor panel 53 increases a noise insulating function thereof to insulate the noise transmission from an exterior to the vehicle room.

Accordingly, in the vibration restraining apparatus for vehicle of this embodiment, the same advantages as that of the embodiment 6 be obtained in that the vibration restraining apparatus can be lightened, the vibration restraining apparatus does not have the temperature dependency, and the vibration restraining can be exercised for plural resonances of different frequencies can be obtained.

In addition, in the vibration restraining apparatus for vehicle of this embodiment, the housing 51 formed into the thin-plate shape by the square tubular member has not protruded from a surface of the floor panel 53 not so much, which is convenient to obtain the attaching space.

The vibration restrain efficiency of is extremely satisfactory since the filled member 52 is sealed in each of three inner spaces formed in the housing 51.

Further, the vibration restrain efficiency of the filled members 52 is formed into the thin or flat-plate shape and sealed in the inner spaces of the housing 51 can be increased, compared with the filled member of the circular pillar shape since it has broader surface area.

Embodiment 8

Figure 42:
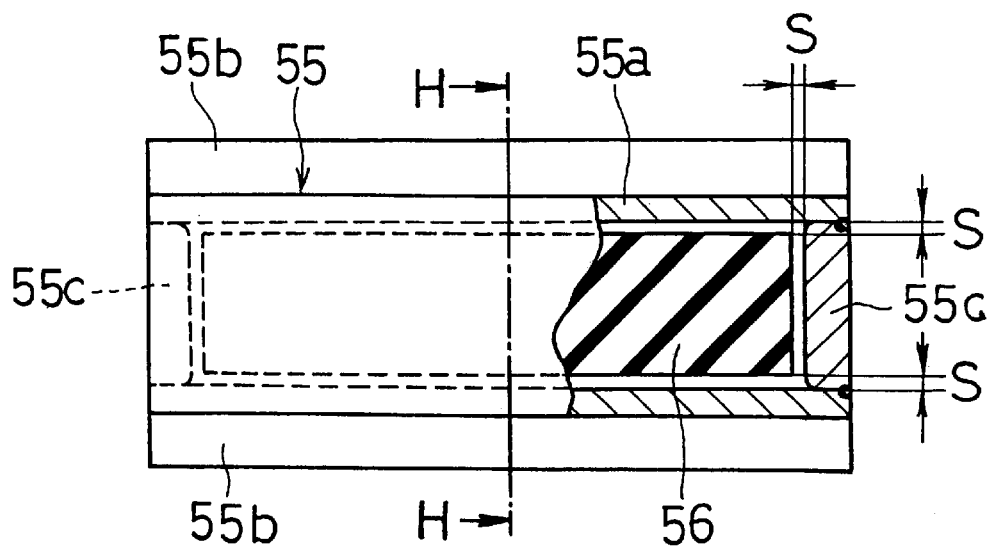
FIG. 42 is a partially broken plan view showing a vibration restraining apparatus for vehicle of an embodiment 8 according to the present invention.
Figure 43:
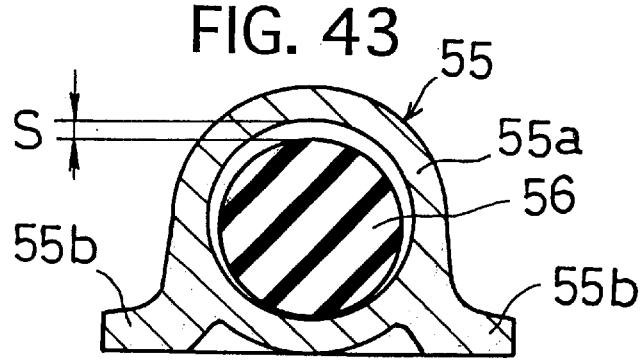
FIG. 43 is a cross-sectional view of the vibration restraining apparatus for vehicle of the embodiment 8 according to the present invention and corresponds to the cross-sectional view taken along a line H—H in FIG. 42.

FIG. 42 is a partially broken plan view showing a vibration restraining apparatus for vehicle of this embodiment, and FIG. 43 is a cross-sectional view of the same taken along a line H—H in FIG. 42.

A vibration restraining apparatus for vehicle of this embodiment is set on an oil pan attached to an engine unit of an automobile. This vibration restraining apparatus for vehicle is, as shown in FIGS. 42 and 43, constructed by a housing 55 made of an aluminium alloy (6NO1) and having an inner space, and a filled member 56 sealed in the inner space in a non-adhered state with leaving a gap S.

The housing 55 includes a body portion 55a formed into a tubular shape of substantially constant diameter, a pair of attach seat portions 55b, 55b extending from an outer peripheral surface of the body portion 55a in a leg-fashion, and a pair of plug members 55c, 55c respectively connected to both ends of the body portion 55a by a laser welding to seal openings. The body portion 55a and the paired attach seat portions 55b, 55b are integrally formed by an extrusion-forming. A closed inner space is formed inside of the housing 55. This housing 5 has the elasticity rate more than $5 \times 10^4$ MPa.

The filled member 56 is wholly constructed by a high specific gravity elastic body produced by mixing a barium sulfate powder of 230 weight part as a specific gravity increasing agent, and various adding agents such as an aging preventing agent, working assisting agent and plasticizer with an olefin series thermoplastic elastmer (TPO) of 100 weight part, and heating and forming them. This high specific gravity elastic body has characteristics that density is 2.0 g/cm 3, Shore D hardness is 53, and tension strength change after aging under 120° C.×70 hours is smaller than 50%. This filled member 56 is formed into a circular pillar shape of size slightly smaller than size of the inner space of the housing 55, and sealed in the inner space in a non-adhered state. As a result, a gap S of 0.3 mm is formed between the filled member 56 and the housing 55, so that the filled member 56 can be freely moved in the inner space.

Figure 44:
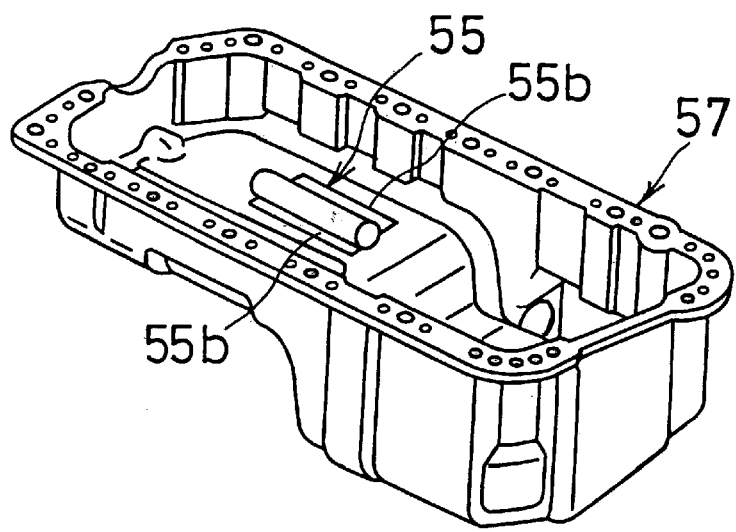
FIG. 44 is a perspective view showing state where the vibration restraining apparatus for vehicle of embodiment 8 according to the present invention is attached to an oil pan.

The vibration restraining apparatus for vehicle of this embodiment constructs as mentioned above is, as shown in FIG. 44, attached to a predetermined position of the oil pan 57 made of a steel iron plate (ADC 12) disposed on an engine unit of an automobile, by fixing the both attach seat portions 55b, 55b by a laser welding. Here, the vibration restraining apparatus for vehicle is preferably attached to the oil pan 57 at a position where a max. amplitude will occur when the oil pan 57 vibrates (position forming an antinode of amplitude) in a direction coinciding with a max. amplitude direction.

When the housing 55 resonates by the vibration transmitted from the oil pan 57 during operation of the engine and running of the automobile, the filled member 56 contacts with the inner surface of the housing 55 at both sides in the vibrating direction to exercise the damping character for plural resonances having different frequencies based on the energy loss due to the sliding friction and the collision. In this way, the large damping character occurs in the housing 55 to restrain vibration thereof, whereby the vibration of the oil pan 57 is effectively restrained.

Thus, the vibration restraining apparatus for vehicle of this embodiment can exercise the damping character based on the energy loss due to the sliding friction and the collision caused by contact of the filled member 56 with the inner surface of the housing 55. Thus, the weight can be lightened, the vibration restraining effect does not have the temperature dependency, and the vibration restraining effect can be exercised for plural resonances having the different frequencies. Especially, the vibration restraining apparatus for vehicle of this embodiment can be sufficiently lightened since the housing 55 is formed by the resin material.

Also, the vibration restraining apparatus for vehicle of this embodiment can be satisfactorily used for the vibration transmitting member such as the oil pan 57 disposed in the high temperature environment, since the filled member 56 is formed by the high specific gravity rubber having the heat-resistance character.

Embodiment 9

Figure 45:
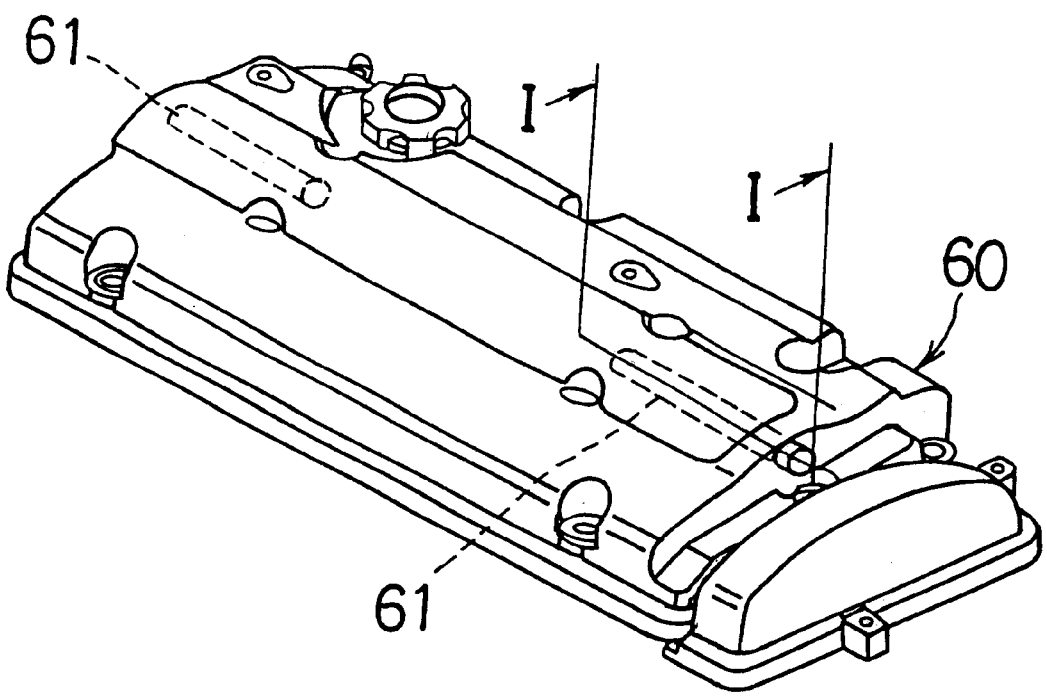
FIG. 45 is a partially broken plan view showing a cylinder head cover to which the vibration restraining apparatus for vehicle of an embodiment 9 according to the present invention is integrally attached.
Figure 46:
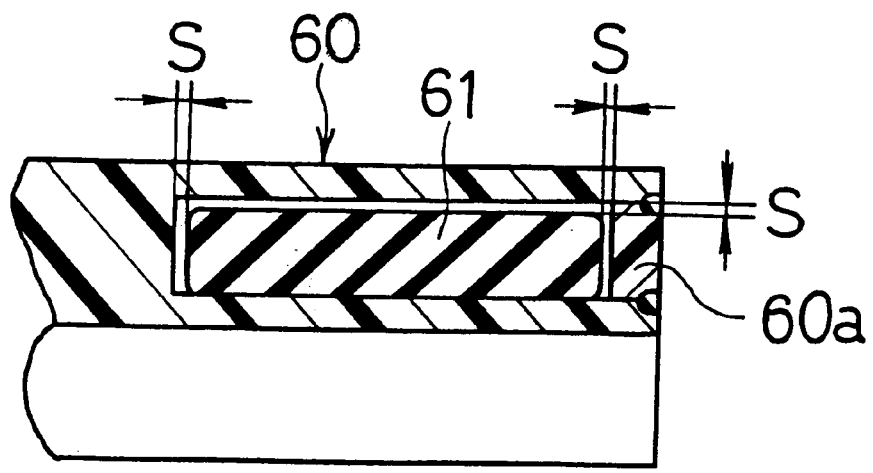
FIG. 46 is a cross-sectional view of the vibration restraining apparatus for vehicle of embodiment 9 according to the present invention and corresponds to the cross-sectional view taken alone line I—I in FIG. 45.

FIG. 45 is a perspective view showing a cylinder head cover to which the vibration-restraining apparatus for vehicle of this embodiment is integrally attached, and FIG. 46 is a cross-sectional view of the same taken along line I—I in FIG. 45.

A vibration restraining apparatus for vehicle of this embodiment is embodied by using a cylinder head cover of an engine of an automobile as a housing. This vibration restraining apparatus for vehicle is, as shown in FIGS. 45 and 46, constructed by a cylinder head cover 60 having two inner spaces as the housing, and filled members 61 respectively sealed in the inner space of the cylinder head cover 60 in a non-adhered state with leaving a gap S.

The cylinder head cover 60 is formed by a heat-resistance hard resin (PA 66) containing glass fibers of 30 weight %, and having two inner spaces formed at both thick ends of a body portion formed by drilling circular holes in them. At opened portion of one end of each inner space a plug. member 60a is fixed by a ultrasonic welding to seal and close the opened portion. The cylinder head cover 60 has an elasticity rate of more than $5 \times 10^4$ MPa.

The filled member 61 is wholly constructed by a high specific gravity elastic body produced by mixing a barium sulfate powder of 230 weight parts as a specific gravity increasing agent, and various adding agents such as an aging preventing agent, working assisting agent and plasticizer with an olefin series thermoplastic elastomer (TPO) of 100 weight parts and heating and forming them. This high specific gravity elastic body has characteristics that density is 2.0 g/cm³, Shore D hardness is 53, and tension strength change after aging under 120° C.×70 hours is smaller than 50%. This filled member 61 is formed into a circular pillar shape of size slightly smaller than size of the inner space of cylinder head cover 60, and sealed in the inner space in a non-adhered state. As a result, a gap S of 0.3 mm is formed between the filled member 61 and the cylinder head cover 60, so that the filled member 61 can be freely moved in the inner space.

During operation of an engine installed on the automobile or running of the automobile, when the cylinder head cove 60 resonates by the vibration of the engine etc., the vibration restraining apparatus exercised in the same way as that of the above embodiment 8. That is, the vibration restraining apparatus exercises the great damping character for the plural resonances having different frequencies, based on the energy loss caused by the sliding friction and collision in abutment of the filled member 61 to an inner surface of the inner space of the cylinder head cover 60. Thus, vibration of the cylinder heed cover 60 is effectively restrained.

Accordingly, in the vibration restraining apparatus for vehicle of this embodiment the advantages same as that of the above embodiment 8 that the weight can be lightened, the vibration restraining effect does not have the temperature dependency, and the vibration restraining effect can be exercised for plural resonances having the different frequencies can be obtained.

In addition, since the vibration restraining apparatus for vehicle of this embodiment is directly attached to the cylinder head cover 60 by utilizing the part thereof, the attaching working of the vibration restraining apparatus for vehicle required when it is formed alone or independently is not required. Thus,.the vibration restraining apparatus for vehicle can be manufactured easily to reduce the cost.

Although the filled members 61 are sealed in two inner spaces formed at two positions of the cylinder head cover 60 in this embodiment, the filled member(s) 61 can be sealed in inner space(s) formed at different position(s) of the cylinder head cover 60, if conditions such as space are satisfied.

What is claimed is:

1. A vibration preventing apparatus for vehicle having a vibration transmitting member, comprising:

a housing formed by a rigid material and having an inner space, said housing being fixable to the vibration transmitting member;

a filled member sealed in the inner space of said housing in a non-adhered state so as to form a gap with respect to a vibrating direction of said housing, said filled member comprising an elastic body at at least a surface thereof, wherein said housing is constructed by said vibration transmitting member in which the inner space is formed.

2. A vibration preventing apparatus for a vehicle according to claim 1, wherein said housing comprises a rigid material having an elasticity rate $5 \times 10^4$ MPA.

3. A vibration preventing apparatus for a vehicle according to claim 1, wherein said housing is formed integrally with said vibration transmitting member.

4. A vibration preventing apparatus for a vehicle as claimed in claim 3, wherein said filled member comprises an elastic member and wherein an assist mass is positioned within said elastic member.

5. A vibration preventing apparatus for a vehicle as claimed in claim 4, wherein said assist mass comprises a substantially rigid material.

6. A vibration preventing apparatus for a vehicle as claimed in claim 4, wherein said vibrating transmission member comprises a mount for being mounted on a movable member.

7. A vibration preventing apparatus for a vehicle as claimed in claim 6, wherein said movable member comprises a vehicle and said mount comprises an engine mount.

8. A vibration preventing apparatus for a vehicle as claimed in claim 4, wherein said filled member is movable within the housing for contacting opposite interior wall portions of said housing.

9. A vibration preventing apparatus for a vehicle according to claim 1, said housing includes a bracket for being fixed to the vibration transmitting member.

10. A vibration preventing apparatus for a vehicle according to claim 1, wherein said filled member has hardness less than a Shore D hardness value of 80 at a surface portion thereof.

11. A vibration preventing apparatus for a vehicle according to claim 1, wherein the elastic body forming at least the surface part of said filler member comprises a high specific gravity rubber body having a density of more than 1.5 g/cm³.

12. A vibration preventing apparatus for a vehicle according to claim 1, wherein the gap formed between said housing and said filled member has a minimum gap rate of less than 30%.

13. A vibration preventing apparatus for a vehicle according to claim 1, wherein the gap formed between said housing and said filled member has a length dimension of 0.1 to 0.5 mm.

14. A vibration preventing apparatus for a vehicle as claimed in claim 1, wherein said vibrating transmission member comprises a mount for being mounted on a movable member.

15. A vibration preventing apparatus for a vehicle as claimed in claim 14, wherein said movable member comprises a vehicle and said mount comprises an engine mount.

16. A vibration preventing apparatus for a vehicle as claimed in claim 14, wherein said filled member is movable within said housing for contacting opposite interior wall portions of said housing.

17. A vibration preventing apparatus for a vehicle as claimed in claim 1, wherein said filled member is movable within said housing for contacting opposite interior wall portions of said housing.

18. A vibration preventing apparatus for a vehicle having a vibration transmitting member, comprising:

a housing formed by a rigid material and having an inner space, said housing being fixable to the vibration transmitting member;

a filled member sealed in the inner space of said housing in a non-adhered state so as to form a gap with respect to a vibrating direction of said housing, said filled member comprising an elastic member with an elastic body at at least a surface thereof wherein an assist mass is positioned within said elastic member.

19. A vibration preventing apparatus for a vehicle having a vibration transmitting member, comprising:

a housing formed by a rigid material and having an inner space, said housing being fixable to the vibration transmitting member;

a filled member sealed in the inner space of said housing in a non-adhered state so as to form a gap with respect to a vibrating direction of said housing, said filled member comprising an elastic member with an elastic body at at least at a surface thereof and an assist mass positioned within said elastic member wherein said assist mass comprises a substantially rigid material.

20. A vibration preventing apparatus for a vehicle having a vibration transmitting member, comprising:

a housing formed by a rigid material and having an inner space, said housing being fixable to the vibration transmitting member;

a filled member sealed in the inner space of said housing in a non-adhered state so as to form a gap with respect to a vibrating direction of said housing, said filled member comprising an elastic member with an elastic body at at least a surface thereof and an assist mass positioned within said elastic member wherein said vibrating transmission member comprises a mount for being mounted on a movable member.

21. A vibration preventing apparatus for a vehicle having a vibration transmitting member, comprising:

a housing formed by a rigid material and having an inner space, said housing being fixable to the vibration transmitting member;

a filled member sealed in the inner space of said housing in a non-adhered state so as to form a gap with respect to a vibrating direction of said housing, said filled member comprising an elastic member with elastic body at at least a surface thereof and an assist mass positioned within said elastic member;

said vibrating transmission member comprising a mount for being mounted on a movable member, said movable member comprising the vehicle and said mount comprising an engine mount.

22. A vibration preventing apparatus for a vehicle having a vibration transmitting member, comprising:

a housing formed by a rigid material and having an inner space, said housing being fixable to the vibration transmitting member;

a filled member sealed in the inner space of said housing in a non-adhered state so as to form a gap with respect to a vibrating direction of said housing, said filled member comprising an elastic member with an elastic body at at least a surface thereof and an assist mass positioned within said elastic member wherein said filled member is movable within the housing for contacting opposite interior wall portions of said housing.

23. A vibration preventing apparatus for vehicle having a vibration transmitting member, comprising:

a housing formed by a rigid material and having an inner space, said housing being fixable to the vibration transmitting member;

a filled member sealed in the inner space of said housing in a non-adhered state so as to form a gap with respect to a vibrating direction of said housing, said filled member comprises an elastic member with an elastic body at at least a surface thereof, wherein the gap formed between said housing and said filled member has a length dimension of 0.1 to 0.5 mm, and wherein an assist mass is positioned within said elastic member.

* * * * *